United States Patent [19]

Bozinovic et al.

[11] Patent Number: 5,544,265
[45] Date of Patent: Aug. 6, 1996

[54] SHAPE RECOGNIZER FOR GRAPHICAL COMPUTER SYSTEMS

[75] Inventors: Radmilo Bozinovic, San Jose; Giulia Pagallo, Cupertino, both of Calif.

[73] Assignee: Apple Computer, Inc., Cupertino, Calif.

[21] Appl. No.: 314,934

[22] Filed: Sep. 29, 1994

Related U.S. Application Data

[63] Continuation of Ser. No. 1,122, Jan. 5, 1993, abandoned, which is a continuation-in-part of Ser. No. 889,216, May 27, 1992, abandoned, and Ser. No. 1,123, Jan. 5, 1993.

[51] Int. Cl.$^6$ .................................................. G06K 9/46
[52] U.S. Cl. ........................ 382/203; 382/202; 382/314
[58] Field of Search ...................................... 382/187, 188, 382/189, 181, 202, 203, 241, 313, 314; 345/179; 395/141, 142, 143

[56] References Cited

U.S. PATENT DOCUMENTS

| | | | |
|---|---|---|---|
| 4,121,442 | 10/1978 | Togawa et al. | 382/25 |
| 4,607,386 | 8/1986 | Morita et al. | 382/24 |
| 4,641,354 | 2/1987 | Fukunaga et al. | 382/24 |
| 4,653,107 | 3/1987 | Shojima et al. | 382/13 |
| 4,718,103 | 1/1988 | Shojima et al. | 382/13 |
| 4,757,549 | 7/1988 | Machart et al. | 382/25 |
| 4,878,249 | 10/1989 | Mifune et al. | 382/13 |
| 4,933,865 | 6/1990 | Yamamoto et al. | 382/25 |
| 4,969,201 | 11/1990 | Takasaki et al. | 382/25 |
| 4,972,496 | 11/1990 | Sklarew | 382/13 |
| 5,038,382 | 8/1991 | Lipscomb | 382/56 |
| 5,065,439 | 11/1991 | Takasaki et al. | 382/25 |

OTHER PUBLICATIONS

O'Connor, Rory J., "Apple banking on Newton's brain," San Jose Mercury News, Apr. 22, 1992.
Weiman et al, "A Step Toward the Future" Macword, Aug. 1992, p. 129.
M. Soviero, "Your World According to Newton" Popular Science, Sep. 1992, pp. 45–49.
F. Abatemarco, "From the Editor" Popular Science, Sep. 1992, p. 4.
Richard O. Duda, Peter E. Hart, "Pattern Classification and Scene Analysis" John Wiley & Sons, 1973, pp. 210–217, 338–339.

*Primary Examiner*—Leo Boudreau
*Assistant Examiner*—Phuoc Tran
*Attorney, Agent, or Firm*—Hickman, Beyer & Weaver

[57] ABSTRACT

An apparatus for recognizing shapes characterized by a stroke grouper receptive to a plurality of strokes formed on a screen of a pen-based computer system; a shape recognition engine receptive to a stroke group produced by the stroke grouper; and a knowledge base coupled to the shape recognition engine, where the knowledge base includes, at a minimum, knowledge concerning closed polygons and closed curves. Preferably, the closed curves of the knowledge base include both circles and ellipses. A method for recognizing digitized shapes in a computer system includes the steps of receiving at least one user-initiated stroke; grouping the user initiated stroke with related strokes to form a stroke group; and analyzing the stroke group to make a best-guess shape represented by the stroke group. Preferably, the method also looks for other shapes which are related to the best-guess shape and modifying at least one of the location, size, or shape of the best-guess shape to conform with the other shapes. The strokes are typically grouped when they are related in time, or space, or in both time and space. A method for recognizing and forming shapes includes the steps of: creating a live group including at least one live stroke; characterizing shape sides from the live group, where a shape side is either straight or curved; forming a polygon from the shape sides if all the shape sides are straight; forming an ellipse from the shape sides if all the shape sides are curved; and forming a composite curve from the shape sides if the shape sides are a mixture of straight sides and curved sides. The step of characterizing shape sides preferably includes the steps of: finding kinks in the live group; defining shape sides as segments between the kinks; and determining whether the shape sides are straight or curved.

8 Claims, 22 Drawing Sheets

| STROKE # | ORDER # | SENSE |
|---|---|---|
| 0 | 3 | 0 |
| 1 | 4 | 0 |
| 2 | 2 | 1 |
| 3 | 5 | 0 |
| 4 | 1 | 1 |

N STROKES ↓

← 134

LIVE GROUP

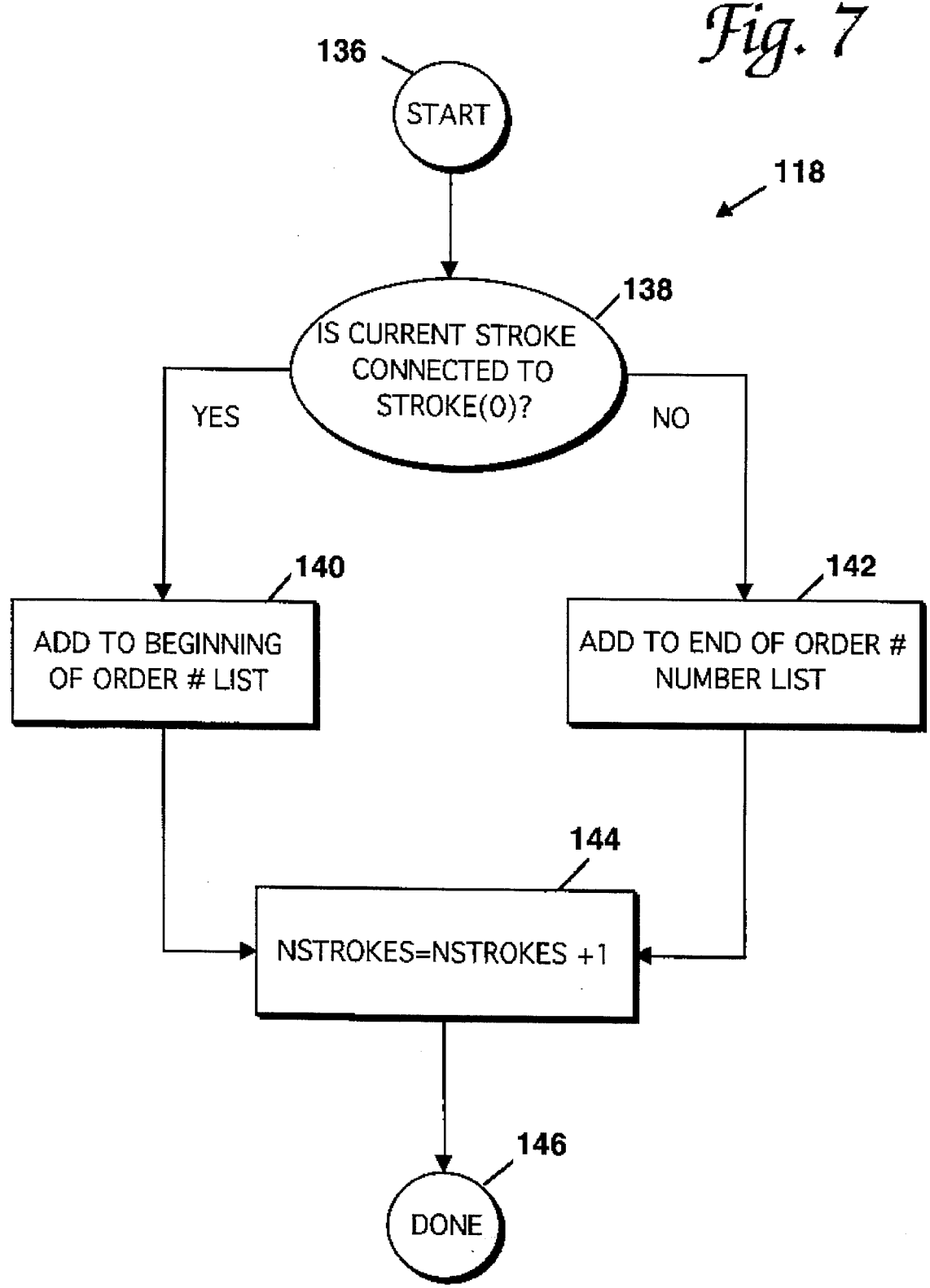

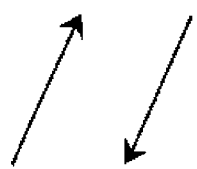
$dx_1 = -dx_2$
$dy_1 = -dy_2$
*Fig. 15a*
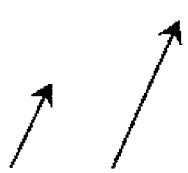
$dx_1 = kdx_2$
$dy_1 = kdy_2$
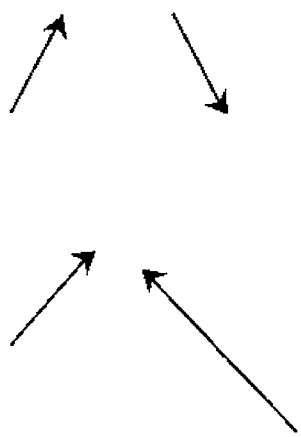
$dx_1 = dx_2$
$dy_1 = -dy_2$
*Fig. 15b*
$dx_1 = -kdx_2$
$dy_1 = kdy_2$
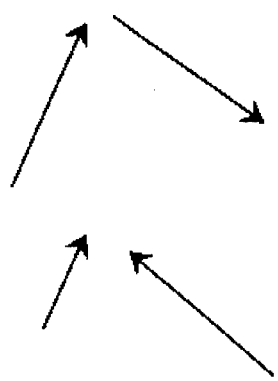
$dx_1 = -dy_2$
$dy_1 = dx_2$
*Fig. 15c*
$dx_1 = kdx_2$
$dy_1 = -kdy_2$

SHAPE RECOGNIZER FOR GRAPHICAL COMPUTER SYSTEMS

Cross-Reference to Related Applications

This is a continuation of application Ser. No. 08/001,122 filed Jan. 5, 1993, now abandoned, which is a continuation-in-part of Ser. No. 07/889,216 filed May, 27, 1992 now abandoned, and a continuation-in-part of Ser. No. 08/001,123 filed Jan. 5, 1993.

The disclosures of each of these parent applications are hereby incorporated herein by reference in their entirety.

BACKGROUND OF THE INVENTION

This invention relates generally to computer systems, and more particularly to graphical user interfaces for computer systems.

Graphical user interfaces or GUI are becoming increasingly popular with computer users. It is generally accepted that computers having graphical user interfaces are easier to use, and that it is quicker to learn an application program in a GUI environment than in a non-GUI environment.

A relatively new type of computer which is well suited for graphical user environments is the pen-based computer system. A pen-based computer system is typically a small, hand-held computer where the primary method for inputting data includes a "pen" or stylus. A pen-based computer system is often housed in a relatively flat enclosure, and has a dual-function display assembly which serves as both an input device and an output device. When operating as an input device, the display assembly senses the position of the tip of a stylus on the viewing screen and provides this positional information to the computer's central processing unit (CPU). Some display assemblies can also sense the pressure of the stylus on the screen to provide further information to the CPU. When operating as an output device, the display assembly presents computer-generated images on the screen.

The dual-function display assemblies of pen-based computer systems permit users to operate the computer as a computerized notepad. For example, graphical images can be input into the pen-based computer by merely moving the stylus across the surface of the screen. A stroke is defined as the engagement of the screen with a stylus, the movement of the stylus across the screen (if any), and its subsequent disengagement from the screen. As the CPU senses the position and movement of the stylus, it generates a corresponding image on the screen to create the illusion that the stylus is drawing the image directly upon the screen, i.e. that the stylus is "inking" an image on the screen. With suitable recognition software, text and numeric information can also be entered into the pen-based computer system in a similar fashion. Besides serving as a notepad, pen-based computers can provide a number of useful functions, such as serving as an address book, an appointment calendar, a to-do list, etc.

Ink on the screen of a pen-based computer system is typically stored as a simple bit-map. Essentially, the only knowledge that the computer system has of the inked image is that certain pixels of the display are activated to create the inked image. Therefore, a hand-drawn shape, such as a square or circle, has no meaning to the system other than certain pixels of the screen are to be turned on or off to create an inked image of the words.

It would be desirable to be able to recognize a hand-drawn shape as falling within a generic class such as squares, circles, etc. In this way, additional meaning can be attached to the hand-drawn shapes, allowing the computer to manipulate the shapes in a more intelligent fashion. For example, it would be desirable for a computer to recognize a hand-drawn square or circle, and return a perfectly formed square or circle in its place.

Some specific application programs of the prior art can perform a limited shape recognition task. For example, some prior art drafting application programs can "auto-trace" a scanned-in image which can be "cleaned up" by the application program. However, the recognizing ability of such application programs is limited, and they do not recognize shapes in a "real-time" manner as would be required in a pen-based computer system.

SUMMARY OF THE INVENTION

The shape recognizer of the present invention is capable of real-time recognition of hand-drawn shapes on the screen of a pen-based computer system. In addition to being able to recognize simple shapes such as triangles, squares, and circles, the recognizer of the present invention can recognize complex open and closed polygons, ellipses, composite curves, etc. The shape recognizer of the present invention also recognizes relationships between a recognized shape and surrounding shapes, and can modify a recognized shape to better fit its environment.

An apparatus for recognizing shapes in accordance with the present invention includes: a stroke grouper receptive to a plurality of strokes formed on the screen of a pen-based computer system and operative to create a stroke group; a shape recognition engine receptive to the stroke group; and a knowledge base coupled to the shape recognition engine, where the knowledge base includes knowledge concerning closed polygons and closed curves. The shape recognition engine in conjunction with the knowledge base attempts to recognize the stroke group as a geometric figure taken from the classes of closed polygons and closed curves. Preferably, the closed curves include ellipses and circles (a degenerate form of an ellipse). More complex forms of the present invention have knowledge bases which include knowledge concerning additional shapes such as open polygons, open curves, triangles, squares, rectangles, parallelograms, lines, dots, etc.

A method for recognizing digitized shapes in a computer system comprises the steps of: receiving at least one user-initiated stroke; grouping the user-initiated stroke with related strokes to form a stroke group; and analyzing the stroke group to make a best-guess shape represented by the stroke group. The method preferably further includes the steps of looking for other shapes which are related to the best-guess shape and modifying at least one of the location, size or shape of the best-guess shape to conform with the other shapes. The grouping step preferably groups strokes that are related in time, or space, or both. Preferably, the analyzing step comprises a form of rule-based analysis of the stroke group.

A method for recognizing and forming shapes in accordance with the present invention includes the steps of: creating a live group including at least one live stroke; characterizing shape sides from the live group, where a shape side is either straight or curved; forming a polygon from the shape sides if all of the shape sides are straight; forming an ellipse from the shape sides if all of the shape sides are curved; and forming a composite curve from the shape sides if the shape sides are a mixture of straight sides and curved sides. Preferably, the step of characterizing shape sides comprises the steps of: finding kinks in the live group; defining shape sides as segments between the kinks; and determining whether the shape sides are straight or curved.

These and other advantages of the present invention will become apparent upon a reading of the following descriptions and a study of the various figures of the drawing.

BRIEF DESCRIPTION OF THE DRAWINGS

FIG. 7 is a flow diagram illustrating the "add current stroke to live group" step of FIG. 5;

FIG. 15A illustrates the "generate equations relating sides" step of FIG. 14;

FIG. 15B illustrates the "generate equations related to rotated angle clusters" step of FIG. 14;

FIG. 15C illustrates the "generate equations related to reflected angle clusters" step of FIG. 14;

DETAILED DESCRIPTION OF THE PREFERRED EMBODIMENTS

The present invention is well suited for pointer based computer systems such as the pen-based, stylus-based and mouse-based systems that are currently popular. For the purposes of illustration, the invention will be described in connection with a pen-based system.

Figure 1:
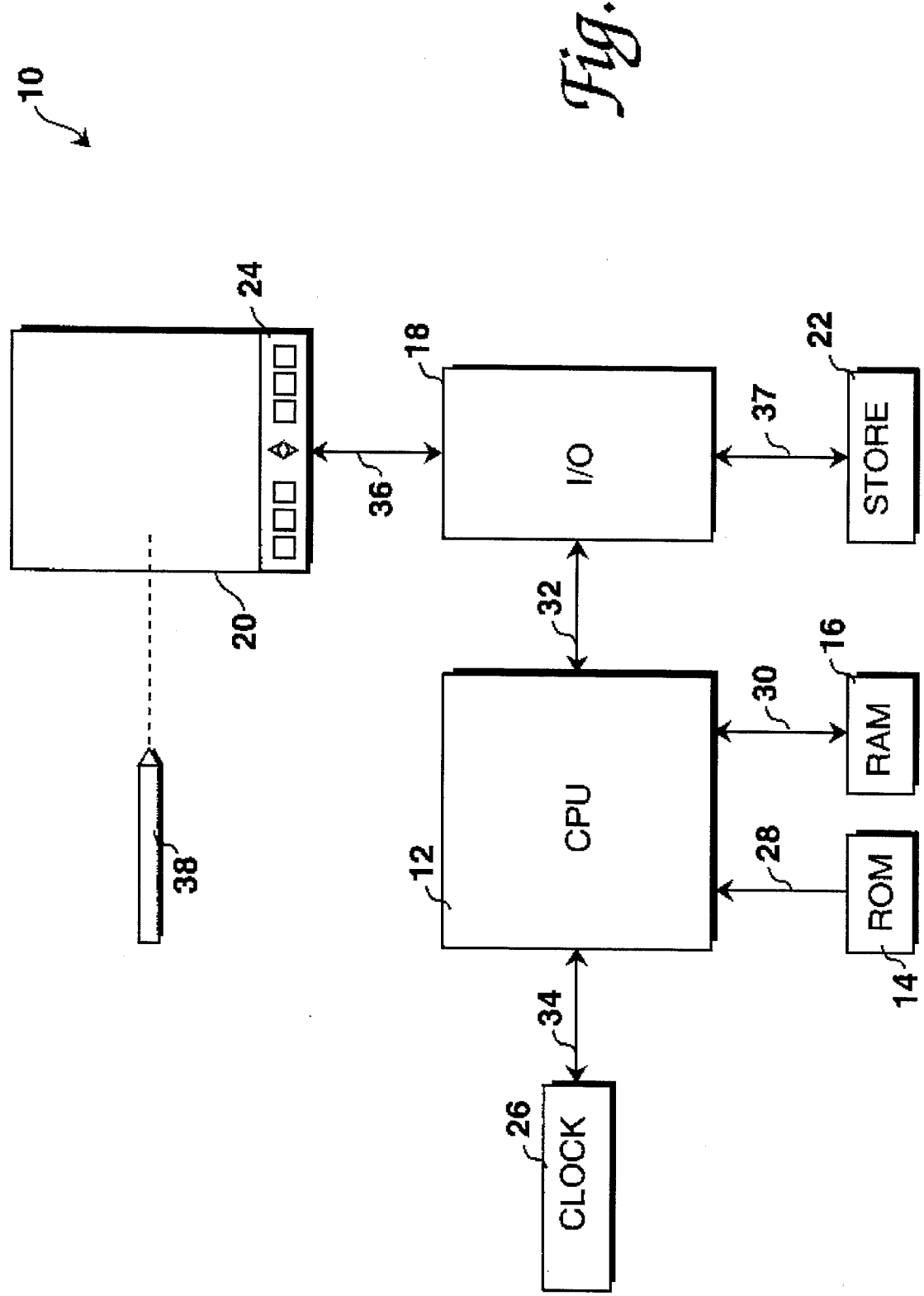
FIG. 1 is a block diagram of a computer system in accordance with the present invention.

As shown in FIG. 1, a pen-based computer system 10 in accordance with the present invention includes a central processing unit (CPU) 12, read only memory (ROM) 14, random access memory (RAM) 16, input/output (i/O) circuitry 18, and a display assembly 20. The pen-based computer system 10 may also optionally include a mass storage unit 22 such as a disk drive unit or nonvolatile memory such as flash memory, a keypad 24, and a clock 26.

The CPU 12 is preferably a commercially available, single chip microprocessor. While CPU 12 can be a complex instruction set computer (CISC) chip, it is preferable that CPU 12 be one of the commercially available, reduced instruction set computer (RISC) chips which are known to be of generally higher performance than CISC chips. CPU 12 is coupled to ROM 14 by a unidirectional data bus 28. ROM 14 contains the basic operating system for the pen-based computer system 10. CPU 12 is connected to RAM 16 by a bi-directional data bus 30 to permit the use of RAM 16 as scratch pad memory. ROM 14 and RAM 16 are also coupled to CPU 12 by appropriate control and address busses, as is well known to those skilled in the art. CPU 12 is also coupled to the I/O circuitry 18 by bi-directional data bus 32 to permit data transfers with peripheral devices.

I/O circuitry 18 typically includes a number of latches, registers and direct memory access (DMA) controllers. The purpose of I/O circuitry 18 is to provide an interface between CPU 12 and such peripheral devices as display assembly 20, mass storage 22, and the keypad 24.

Clock 26 provides a series of clock pulses and is typically coupled. to an interrupt port of CPU 12 by a data line 34. The clock pulses are used to time various functions and events relating to the computer system 10. The clock 26 can be eliminated and the clock function replaced by a software clock running on CPU 12, but this tends to be a wasteful use of CPU processing power. In the present invention, clock 26 provides clock pulses at 60 hertz (Hz).

Display assembly 20 of pen-based computer system 10 is both an input and an output device. Accordingly, it is coupled to I/O circuitry 18 by a bi-directional data bus 36. When operating as an output device, the display assembly 20 receives data from I/O circuitry 18 via bus 36 and displays that data on a suitable screen. The screen for display assembly 20 is preferably a liquid crystal display (LCD) of the type commercially available from a variety of manufacturers. The input device of display assembly 20 is preferably a thin, clear membrane which covers the LCD display and which is sensitive to the position of a stylus 38 on its surface. These position sensitive membranes are also readily available on the commercial market. Combination display assemblies such as display assembly 20 which include both the LCD and the input membrane are available from such vendors as Scriptel Corporation of Columbus, Ohio.

The keypad 24 can comprise an array of switches. In the present embodiment, the keypad 24 comprises mechanical buttons which overlie the bottom edge of the membrane which covers the LCD display. When the buttons are depressed, the membrane senses the pressure and communicates that fact to the CPU 12 via I/O 18.

Other types of pointing devices can also be used in conjunction with the present invention. While the method of the present invention is described in the context of a pen-based system, other pointing devices such as a computer mouse, a track ball, or a tablet can be used to manipulate a pointer on a screen of a general purpose computer. Therefore, as used herein, the terms "pointer", "pointing device", "pointing means", and the like will refer to any mechanism or device for pointing to a particular location on a screen of a computer display.

Some type of mass storage 22 is generally considered desirable. However, the mass storage 22 can be eliminated by providing a sufficient amount of RAM 16 to store user application programs and data. In that case, the RAM 16 could be provided with a backup battery to prevent the loss of data even when the pen-based computer system 10 is turned off. However, it is generally desirable to have some type of long term storage 22 such as a commercially available miniature hard disk drive, nonvolatile memory such as flash memory, battery backed RAM, PC-data cards, or the like.

In operation, information is input into the pen-based computer system 10 by "writing" on the screen of display assembly 20 with the stylus 38. Information concerning the location of the stylus 38 on the screen of the display assembly 20 is input into the CPU 12 via I/O circuitry 18. Typically, this information comprises the Cartesian (i.e. x & y) coordinates of a pixel of the screen of display assembly 20 over which the tip of the stylus is positioned. Commercially available combination display assemblies such as the aforementioned assemblies available from Scriptel Corporation include appropriate circuitry to provide the stylus location information as digitally encoded data to the I/O circuitry of the present invention. The CPU 12 then processes the data under control of an operating system and possibly an application program stored in ROM 14 and/or RAM 16. The CPU 12 next produces data which is output to the display assembly 20 to produce appropriate images on its screen.

Figure 2:
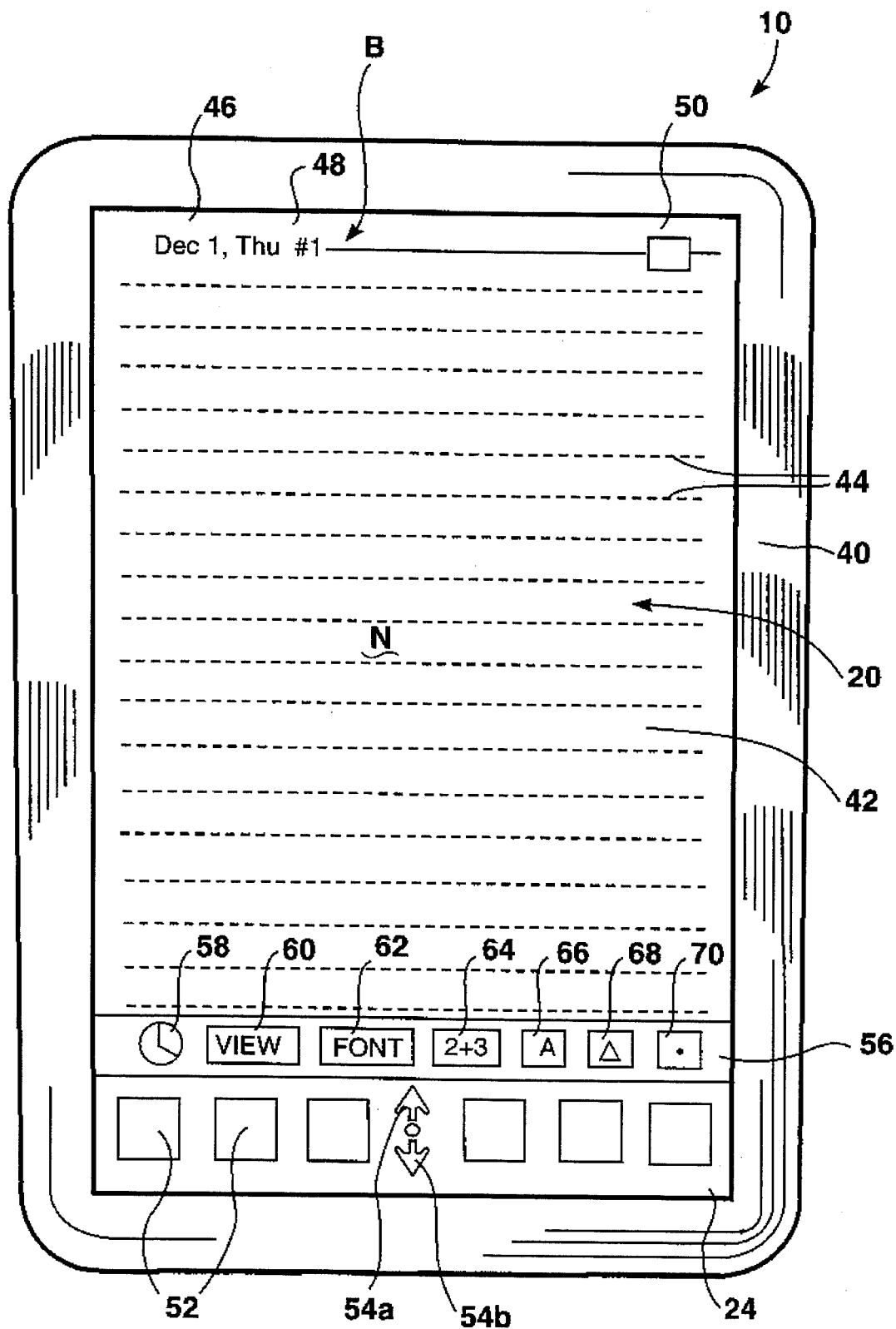
FIG. 2 is a top plan view of the screen, case, and keypad of the computer system of FIG. 1.

In FIG. 2, the pen-based computer system 10 is shown housed within a generally rectangular enclosure 40. The CPU 12, ROM 14, RAM 16, I/O circuitry 18, mass storage 22, and clock 26 are preferably fully enclosed within the enclosure 40. The display assembly 20 is mostly enclosed within the enclosure 40, but a viewing screen 42 of the display assembly is exposed to the user. As used herein, the term "screen" will refer to the portion of the display assembly 20 which can display an image that can be viewed by a user. Also accessible to the user is the keypad 24.

Upon power-up, pen based computer system 10 displays on screen 42 an initial note area N including a breaker bar B and a number of guidelines 44. The breaker bar B preferably includes the day and date of creation 46 of the note N, a note number 48, and a "router" button 50 which allows notes to be dispatched to a printer, facsimile, the trash, etc. The optional guidelines 44 aid a user in entering text, graphics, and data into the pen-based computer system 10.

In this preferred embodiment, the keypad 24 is not a part of the viewing screen 42 but rather, is a permanent array of input buttons Coupled to the CPU 12 by I/O circuitry 18. Alternatively, the keypad 24 could comprise "soft buttons" generated at a convenient location on the screen 42, in which case a "button" would be activated by touching the stylus to the screen over the image of the button. The keypad 24 preferably includes a number of dedicated function buttons 52 and a pair of scroll buttons 54A and 54B. The operation of the scroll buttons 54A and 54B, and other aspects of computer system 10 are discussed in greater detail in co-pending U.S. patent application Ser. No. 07/868,013, filed Apr. 13, 1992 on behalf of Tchao et al. and entitled "Method for Manipulating Notes on a Computer Display". That application is assigned to the assignee of the present application and its disclosure is hereby incorporated by reference in its entirety.

The screen illustrated in FIG. 2 is referred to as the "notepad", and is an application program running under the operating system of the pen based computer system 10. In this preferred embodiment, the notepad is a special or "base" application which is always available beneath higher level applications. The notepad application, like other applications, runs within a window, which in this instance comprises the entire viewing screen 42. Therefore, as used herein, a "window" is the entire screen or any portion of an entire screen which is dedicated to a particular application program.

A status bar 56 is provided at the bottom of the notepad application. The status bar 56 is provided with a number of active areas including a real time clock 58, a view button 60, a font button 62, a formulas button 64, a text button 66, a graphics button 68, and a nib button 70. Co-pending U.S. patent application Ser. No. 07/976,970, filed Nov. 16, 1992 on behalf of Foster et al., now abandoned entitled "Status Bar for Application Windows" and assigned to the assignee of the present invention describes the operation of the status bar, and is hereby incorporated herein by reference in its entirety.

Figure 3:
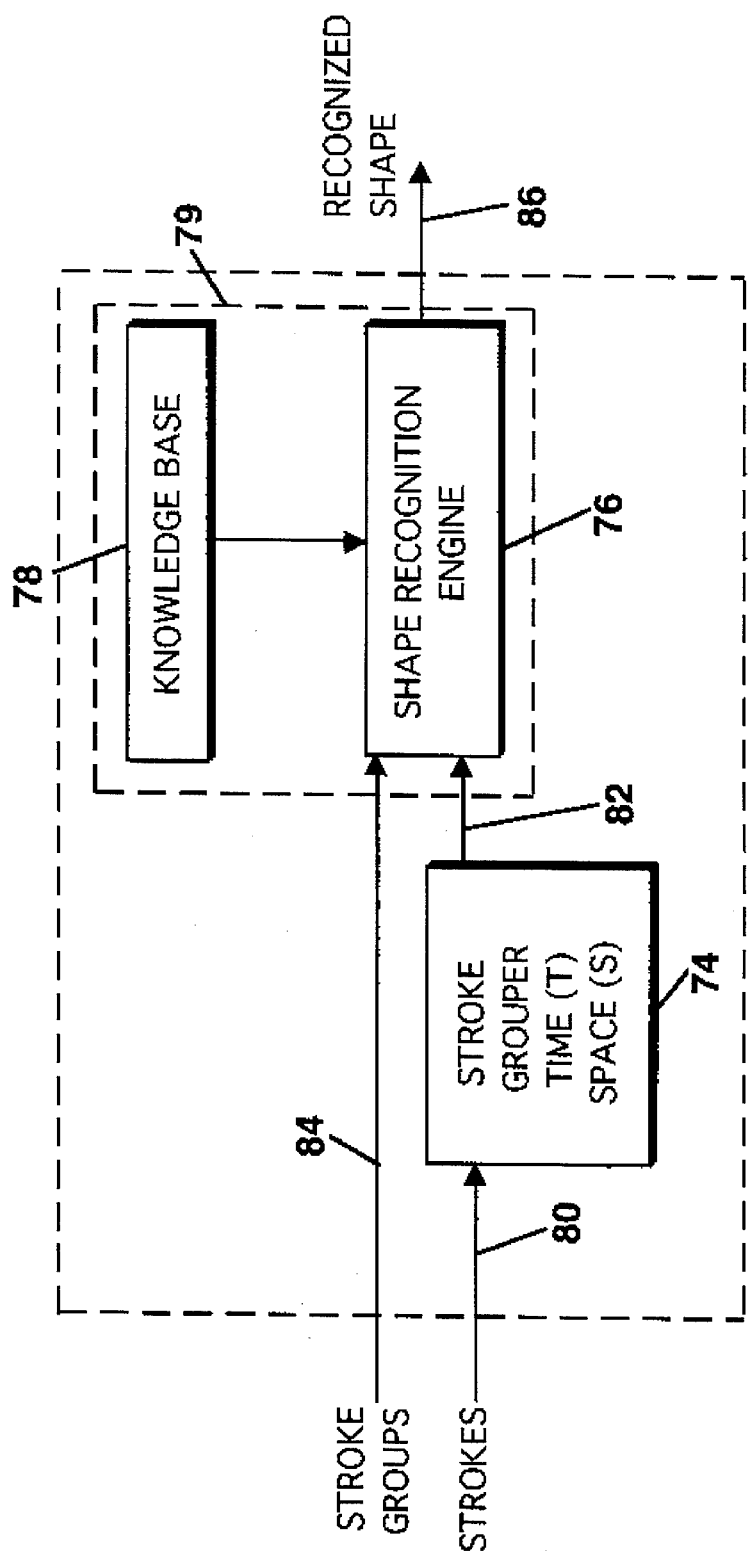
FIG. 3 is a block diagram of an apparatus for recognizing shapes in accordance with the present invention.

FIG. 3 illustrates an apparatus 72 in accordance with the present invention for recognizing shapes. The apparatus 72 includes a stroke grouper 74, a shape recognition engine 76, and a knowledge base 78. The engine 76 and knowledge base 78 often form a single integrated unit 79, but can be thought of as separate functional items. The apparatus 72 is preferably implemented as a computer implemented process on the hardware shown and described if FIG. 1. Alternatively, the apparatus 72 can be implemented in hardware, as is well known to those skilled in the art.

The stroke grouper 74 is receptive to strokes 80 formed on the screen of a pen-based computer system such as computer system 10, or to stroke units generated by any other means. For example, strokes 80 could be generated on a pressure-sensitive tablet attached to a conventional computer system. The stroke grouper 74 is operative to produce a stroke group 82 which is input into the shape recognition engine 76. The shape recognition engine 76 can also receive stroke groups 84 from other sources, such as through an I/O port, etc.

Stroke grouper 74 groups strokes according to time (T) and space (S). If strokes 80 are close both in time and space, they form part of a "live set" and are considered a part of the stroke group. As used herein, "stroke group" comprises a data structure which characterizes one or more user-initiated strokes.

The shape recognition engine 76 uses the knowledge in the knowledge base 78 to propose a best-guess recognized shape 86. The knowledge base 78 of the present invention emphasizes rules for recognizing closed polygons and closed curves. The closed polygons can have three or more sides, and the closed curves preferably comprise circles and ellipses. The knowledge base 78 also includes rules concerning specific polygons, such as triangles, squares, rectangles, parallelograms, etc., rules concerning open polygons and open curves, rules concerning lines, and rules concerning dots.

Figure 4:
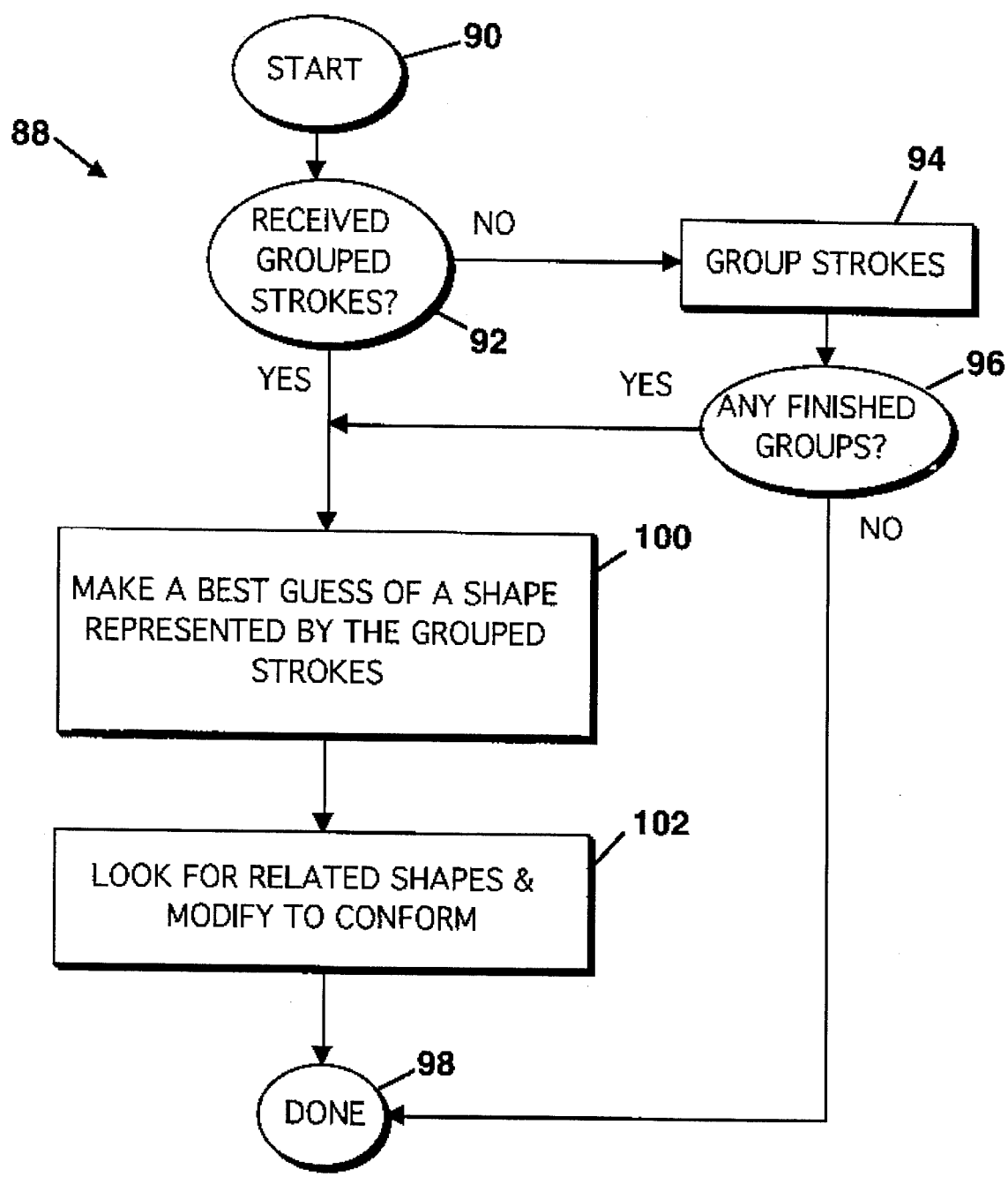
FIG. 4 is a flow diagram of a method for recognizing digitized shapes in a computer system in accordance with the present invention.

FIG. 4 illustrates a computer implemented process 88 for recognizing digitized shapes in a computer system. The process 88 starts at 90 with a new stroke of timeout, and then a step 92 determines whether grouped strokes have been received. If not, a step 94 groups the strokes, and a step 96 determines whether there are any finished groups to pass. If there are not any finished groups, the process 88 is completed as indicated at 98. If there are any finished groups, a step 100 makes a best guess of a shape represented by the stroke group and passes the appropriate parameters in a step 100. Next, in a step 102, the system 10 looks for related shapes to the best-guess shape and modifies the best-guess shape to conform to the related shapes. The process 88 is then completed as indicated at 98.

Figure 5:
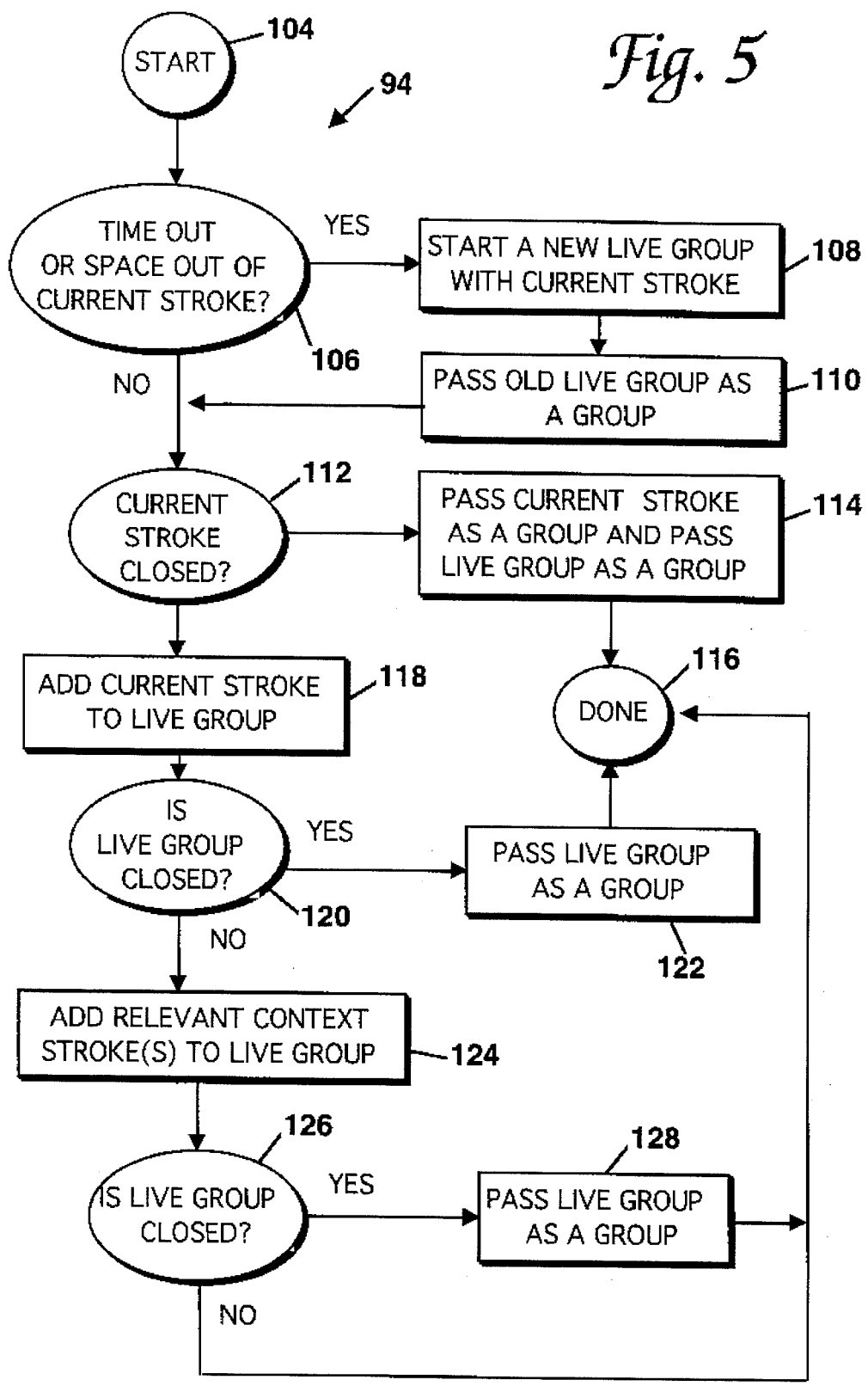
FIG. 5 is a flow diagram of the "group strokes" step of FIG. 4.

FIG. 5 illustrates the step 94 of FIG. 4 in greater detail. The process 94 begins at 104 with a new stroke or a timeout, and it is determined in a step 106 whether there has been a timeout or spaceout of the current stroke in a step 106. A timeout occurs when there is a longer than Δt interval between strokes, and a spaceout occurs when there is a larger than Δd distance between a stroke and a live group of strokes. If there has been a timeout or spaceout, a new live group is started with the current (incoming) stroke in a step 1.08, and the old live group is passed as a group in a step 110 before process control returns to step 112. If step 106 determines that there is not a timeout or a spaceout, step 112 determines whether the current stroke is closed. If the current stroke is closed, a step 114 passes the current (incoming) stroke as a group and passes the live group as another group and the process is completed as indicated at 116. If the current stroke is not closed as determined by step 112, the current stroke is added to the live group in a step 118. A step 120 then determines whether the live group is closed and, if it is, a step 122 passes the live group, after which time the process 94 is completed as indicated at 116. If step 120 determines that the live group is not closed, relevant context strokes are added to the live group in a step 124. Step 126 then determines whether the live group is closed and, if it is, the live group is passed in a step 128 and the process is completed at step 116. Alternatively, if the live group is not closed as determined by step 126 the process 94 is completed at step 116.

Figures 6A, 6B:
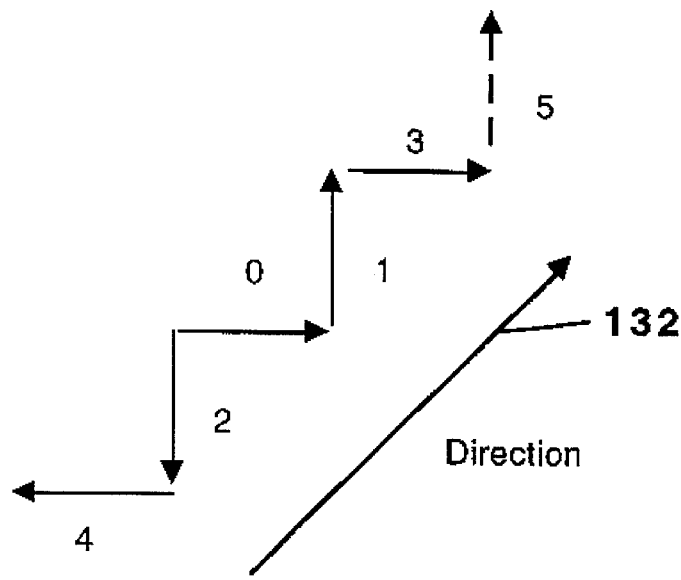
FIGS. 6A and 6B are used to further illustrate the "group strokes" step of FIG. 4.

FIGS. 6A and 6B help illustrate the concept of a live group and how a stroke can be added to the live group as in step 118 of FIG. 5. With reference to FIG. 6A, five strokes have been made on the screen in the order 0, 1, 2, 3, and 4. The direction of each individual stroke is indicated by the arrow. The overall direction of the combined strokes is indicated by the arrow 132. A sixth stroke (labeled "5") is shown in broken lines to illustrate how a stroke is added to a live group of strokes. As used herein, the term "live group" refers to a related group of strokes that is open to additions at that particular point in time.

In FIG. 6B, a table is used to further illustrate the concept of a "live group." A live group 134 includes a number of individual strokes NSTROKES. The strokes may be stored in chronological order starting with stroke number and ending with stroke number NSTROKES-1. This stroke number is shown in the first column of Table 133. The second column of Table 133 indicates the order number within the live group taken as a whole. Referring briefly to FIG. 6A, if the direction to be taken as indicated in 132, the live group begins with stroke number 4 (order #1), and continues with strokes 2, 0, 1, and 3. The last column in Table 133 is the "sense" of the stroke. Again, the sense is taken with reference to the overall direction 132 (see FIG. 6A) where the sense is "0" if it is in the direction 132, and is "1" if the direction is not in the direction 132. Therefore, strokes 2 and 4 have a "1" sense, and strokes 0, 1, and 3 have "0" senses.

FIG. 7 further illustrates the step 118 "add current stroke to live group" of FIG. 5. The process 118 begins at 136 and, in a step 138, it is determined whether the current or incoming stroke is "connected" to the first stroke in the live group, i.e. STROKE(O), which in this case was stroke number 4 (order number 1). If it is, this current or incoming stroke is added to the beginning of the order number list in a step 140. If step 138 determines it is not connected to the first order number, it must be connected to the last order and, therefore, it is added to the end of the order number list in a step 142. The number of strokes NSTROKES in the live group is iterated by one in a step 144, and the process is completed at 146.

Figure 8:
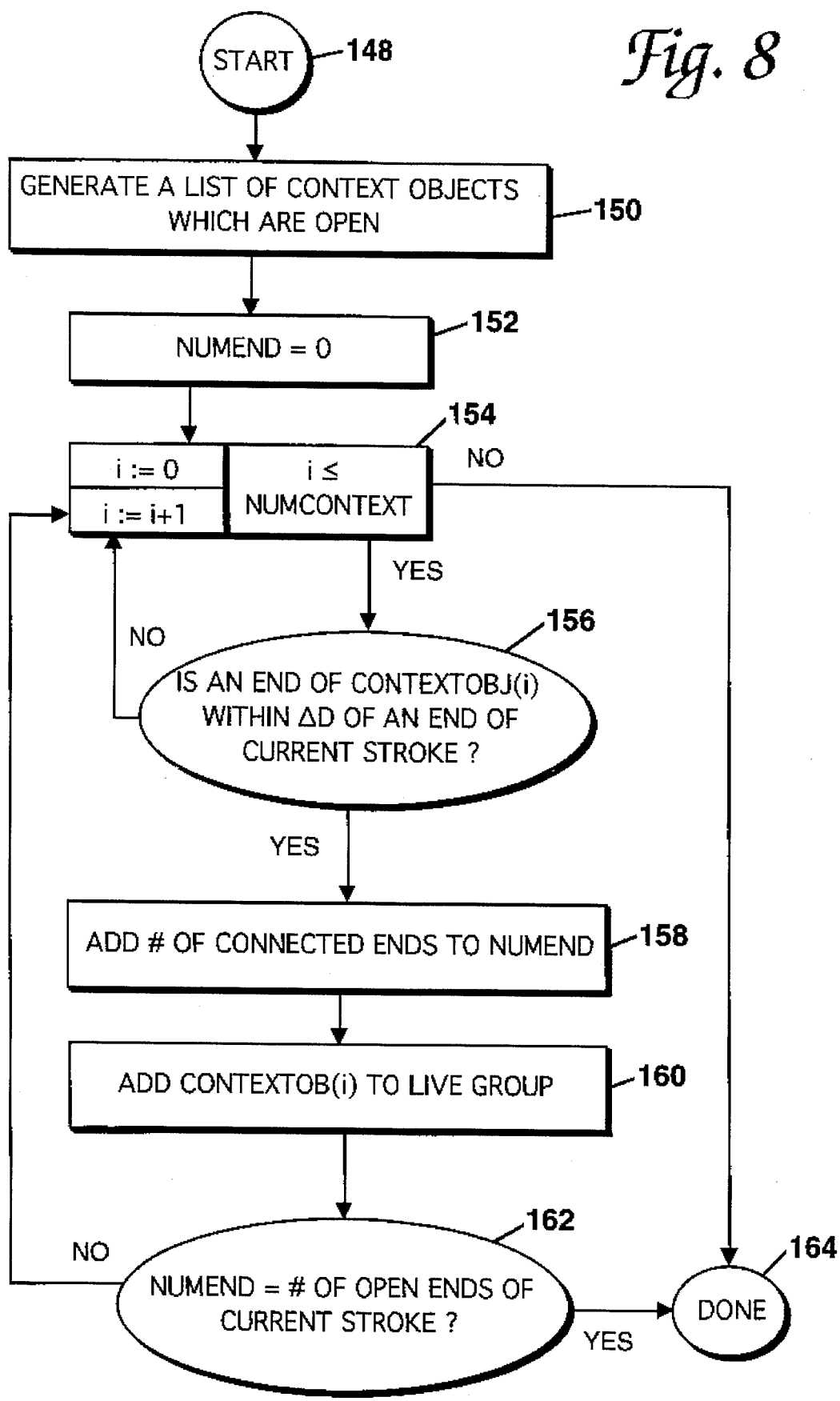
FIG. 8 is a flow diagram illustrating the "add relevant context strokes to live group" step of FIG. 5.

FIG. 8 illustrates the step 124 "add relevant context strokes to live group" of FIG. 5. The process 124 starts at 148, and a list of context objects which are open are generated in a step 150 and NUMCONTEXT is defined. Next, in a step 152, the variable "NUMEND" is set to zero. An iterative step 154 sets a counter i to zero and compares it with the constant NUMCONTEXT which was determined in step 150. If the variable i is less than NUMCONTEXT, a decision step 156 determines whether there is an end of the $i^{th}$ context object CONTEXTOBJ (i) within ΔD of an end of the live group. If not, process control is returned to iterative step 154 and the counter i is incremented. If an end of CONTEXTOBJ (i) is within ΔD of an end of the current stroke as determined by step 156, a step 158 adds the number of connected ends to the variable NUMEND. Next, in a step 160, CONTEXTOBJ (i) is added to the live group. The step 160 is very similar to the step 118 of FIG. 5, which is illustrated in FIG. 7. Next, in a step 162, it is determined whether the number of ends NUMEND is equal to the number of open ends in the current stroke. If not, process control is returned to iterative step 154 and the variable i is incremented. If NUMEND equals two in step 162 then the process is completed as indicated in step 164. The process also completes when the iterative Step 154 determines that the counter i is greater than or equal to the constant NUM-CONTEXT.

Figure 9:
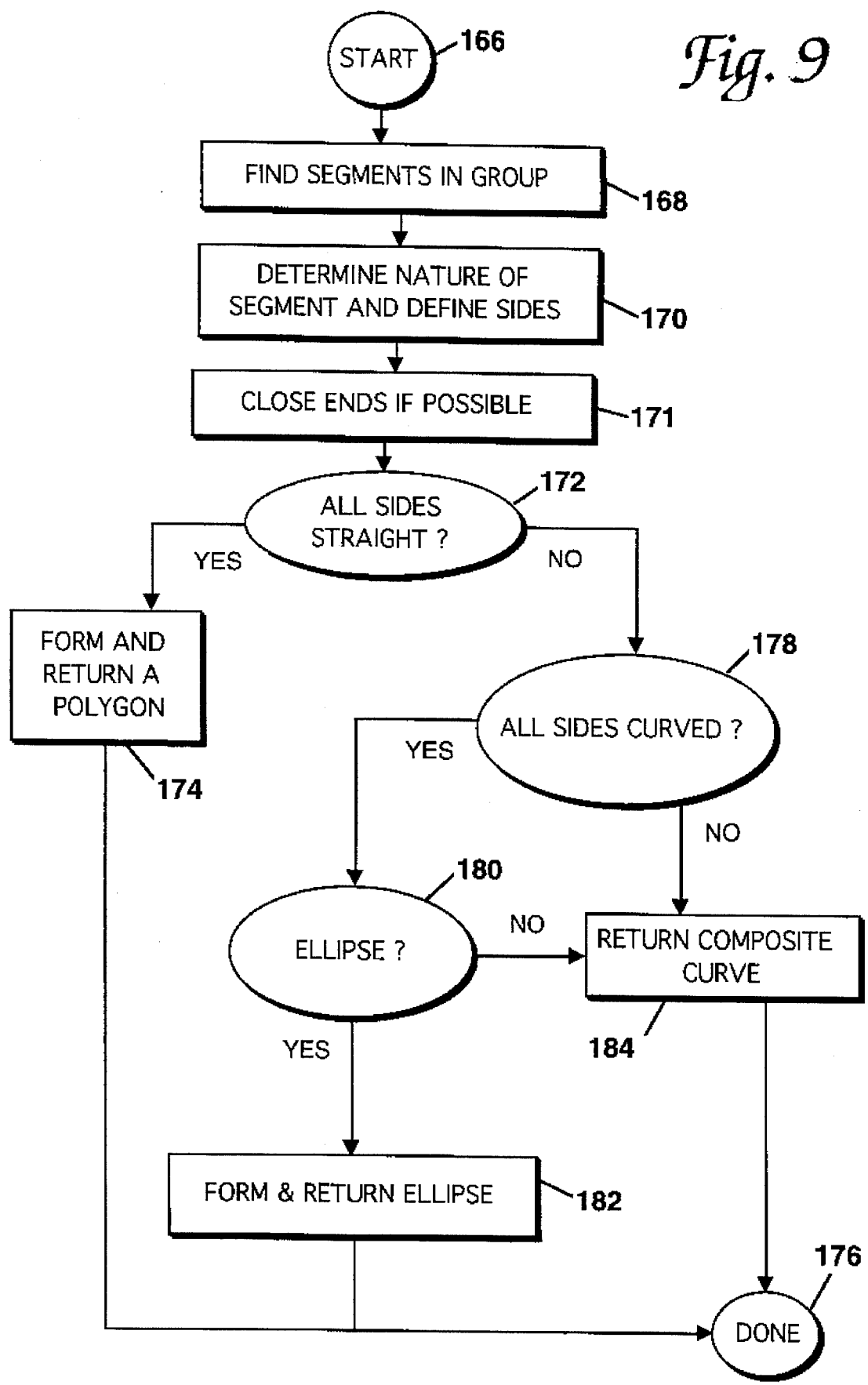
FIG. 9 is a flow diagram illustrating the "make a best guess" step of FIG. 4.

FIG. 9 illustrates step 100 of FIG. 4 in greater detail. The process starts at 166 and, in a step 168, the segments in the live group are found. Next, in a step 170, the nature of the segments in the live groups are determined, and sides are defined. In step 17 1, ends are closed in a smooth fashion (as opposed to chinked) if possible. In a decision step 172, it is determined whether all of the sides in the live group are straight. If so, a step 174 forms and returns a polygon, and the process is completed as indicated at 176. If step 172 determines that not all the sides are straight, a decision step 178 determines whether all the sides are curved. If all of the sides in the live group are curved, a step 180 determines whether the live group forms an ellipse. The term "ellipse" as used herein shall mean a traditional ellipse having two foci, and the degenerate form of an ellipse, a circle, where the two foci are coincident at the center of the circle. If step 180 determines that the live set forms an ellipse, an ellipse is formed and returned in a step 182 and the process is completed at 176. If step 180 determines that the live set does not form an ellipse, a composite curve is formed and returned in a step 194 and the process is, once again, completed at 176.

Figure 10:
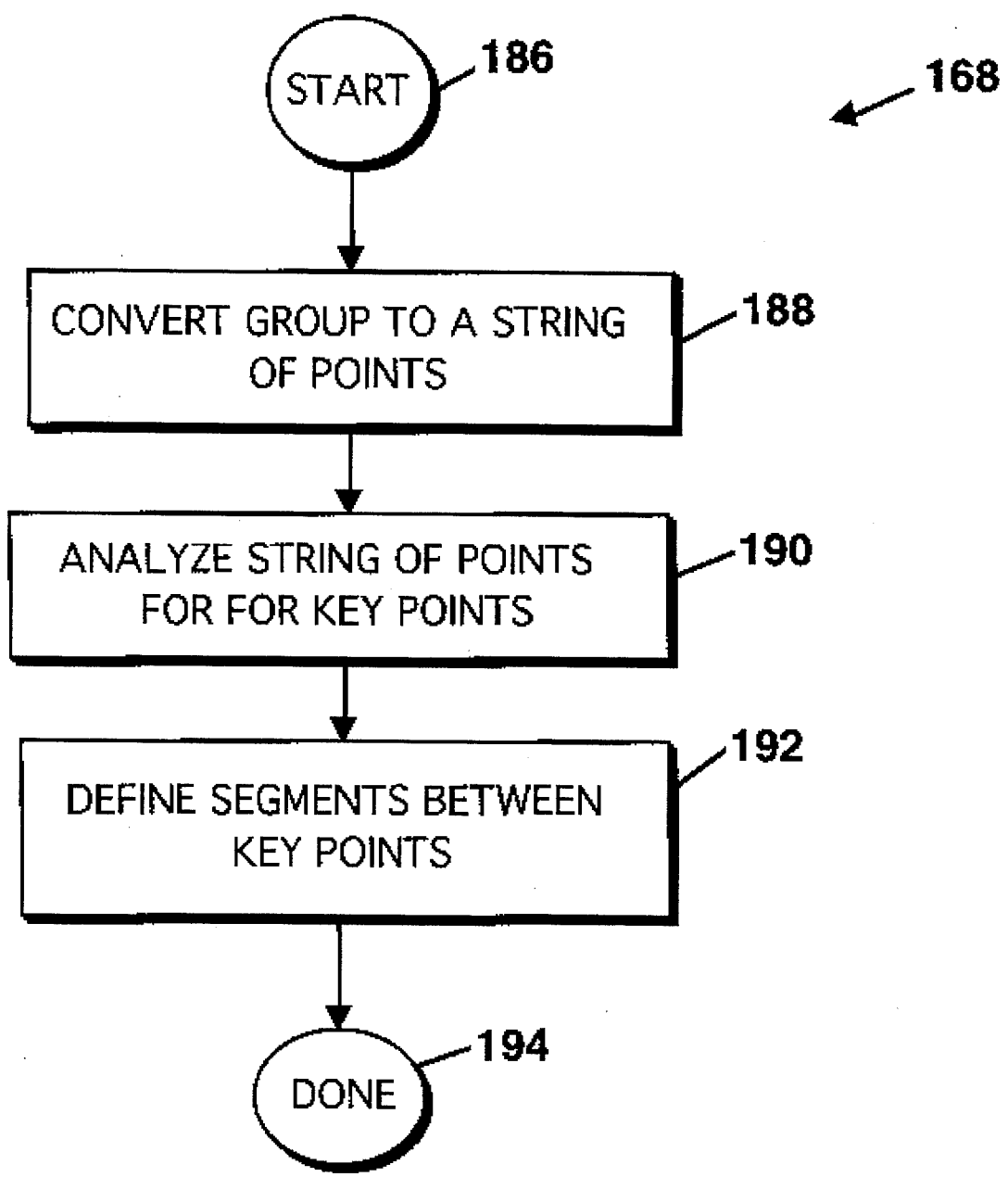
FIG. 10 is a flow diagram of the "find segment in live group" step of FIG. 9.

FIG. 10 illustrates step 168 of FIG. 9 in greater detail. The process starts at 186 and, in a step 188, the live group is convened into a string of points. Next, in a step 170, the string of points are analyzed for "key points", i.e. points which may be the interface between two sides of a graphical object. Finally, in a step 192, segments are defined between the key points determined by step 190. The process is then complete as indicated at 194.

Figure 11:
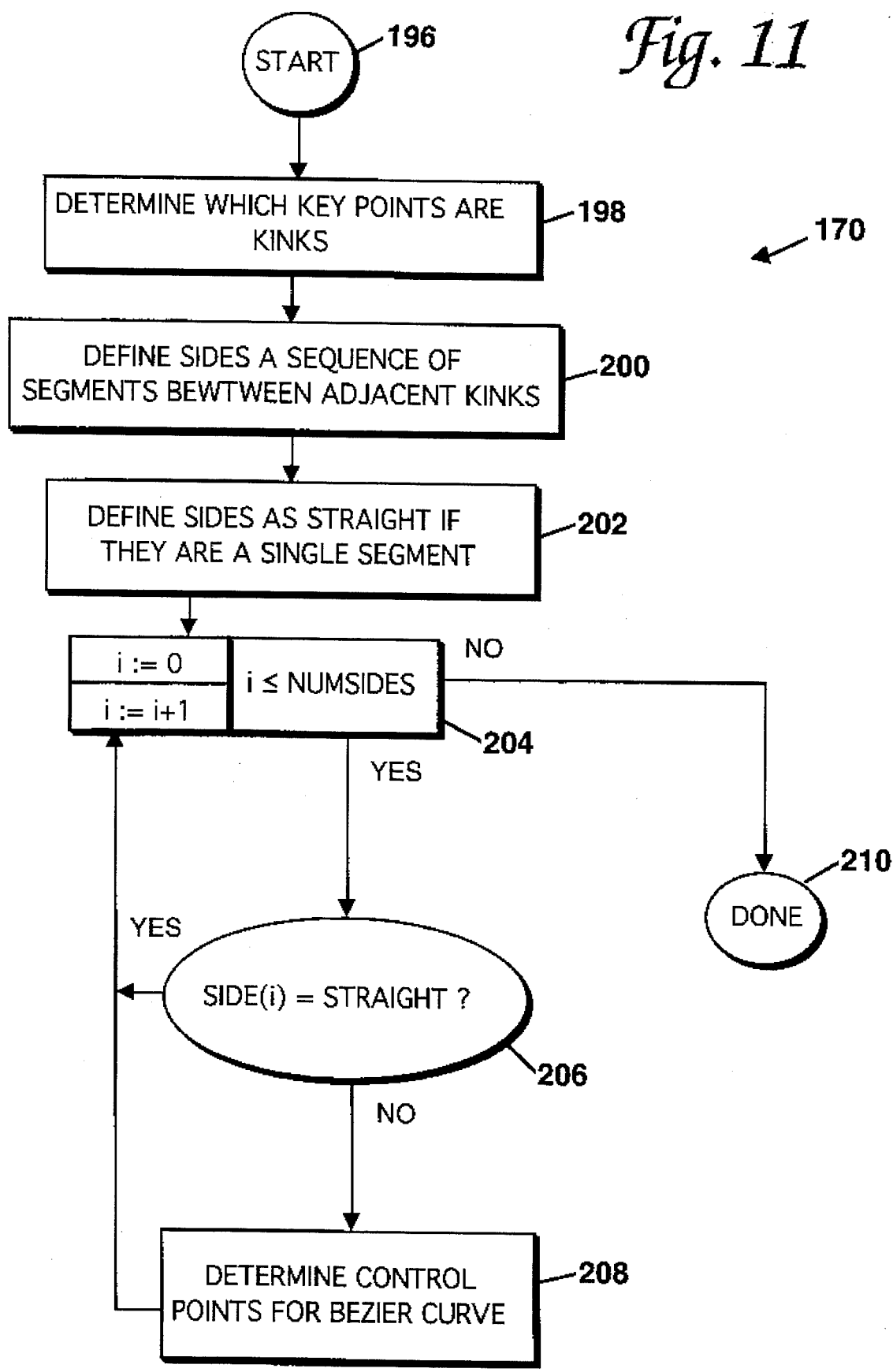
FIG. 11 is a flow diagram of the "determine nature of segments" step of FIG. 9.

FIG. 11 illustrates the step 170 of FIG. 9 in greater detail. Process 170 begins at 196, and a step 198 determines which key points are "kinks", i.e. points which are actual interfaces between two sides. Next, in a step 200, "sides" of an object are defined as a sequence of segments between adjacent kinks. Next, in a step 202, the sides are defined as straight if they comprise a single segment only. An iterative step 204 initializes a counter i to zero, and compares the counter i to the variable NUMSIDES, which holds the number of sides of the graphical object. If the variable i is less than NUMSIDES, it is determined in a step 206 whether the $i^{th}$ side SIDE(i) is straight. If so, process control is returned to step 204 and counter i is iterated. If not, a step 208 determines the control points for the conic or quadratic Bezier curve (preferably by finding tangent vectors) which best represents the side. Process control is then once again turned over to iterative loop step 204. The process 170 is completed when i is greater than or equal to NUMSIDES as indicated in step 210.

Figure 12:
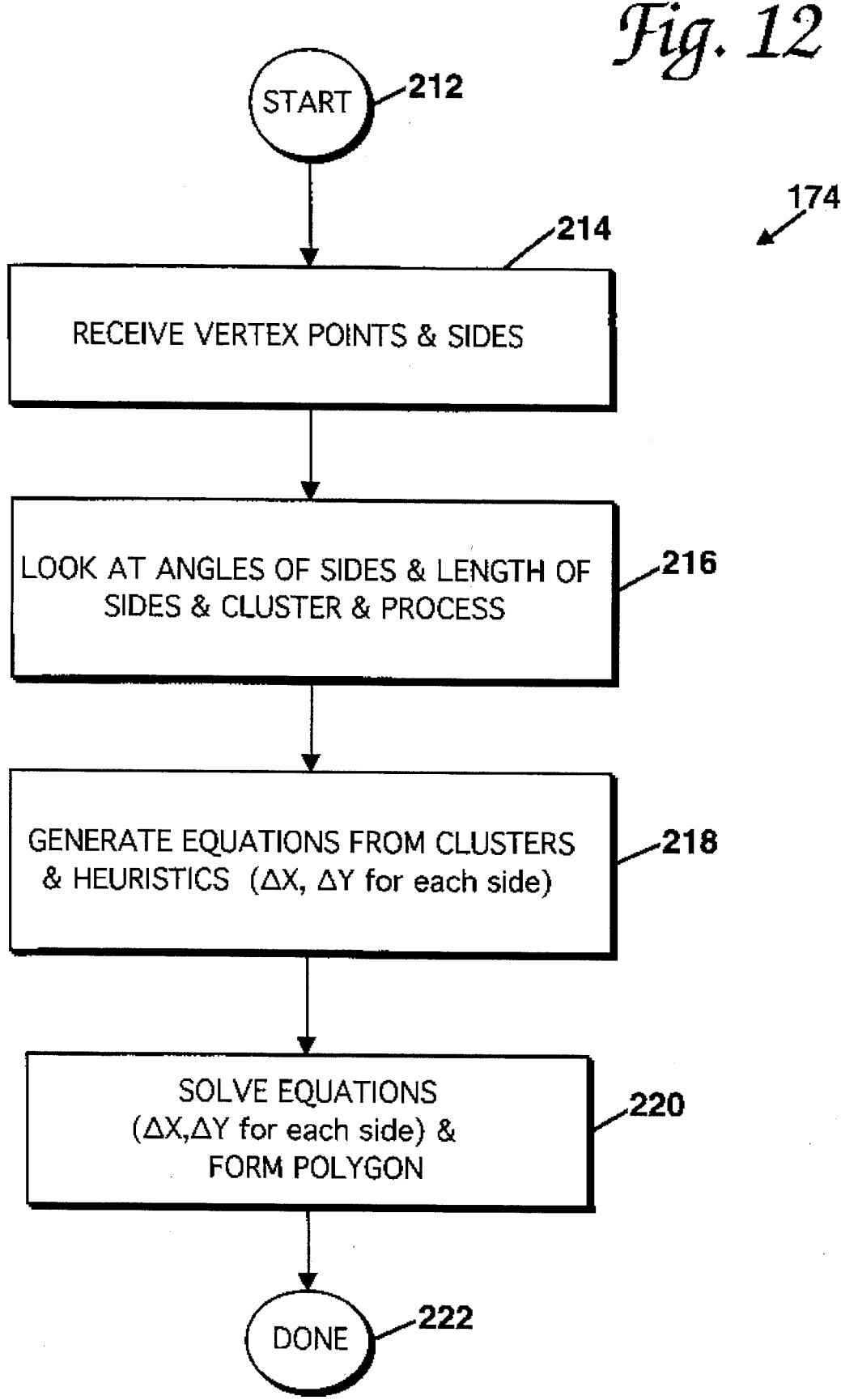
FIG. 12 is a flow diagram of the "form and return a polygon" step of FIG. 9.

FIG. 12 illustrates the step 174 of FIG. 9 in greater detail. The process 174 begins at 212, and the vertex points and sides are received in a step 214. Step 216 looks at the angles of the sides and the lengths of the sides, performs a clustering step, and processes the clustered angles and sides. Next, in a step 218, equations are generated from the clusters and from heuristics built in the system, to determine a ΔX, ΔY for each side in a step 218. Finally, in a step 220, a number of simultaneous equations (i.e. ΔX, ΔY for each side) are solved, and the polygon is formed. The process is then completed as indicated at 222.

Figure 13A:
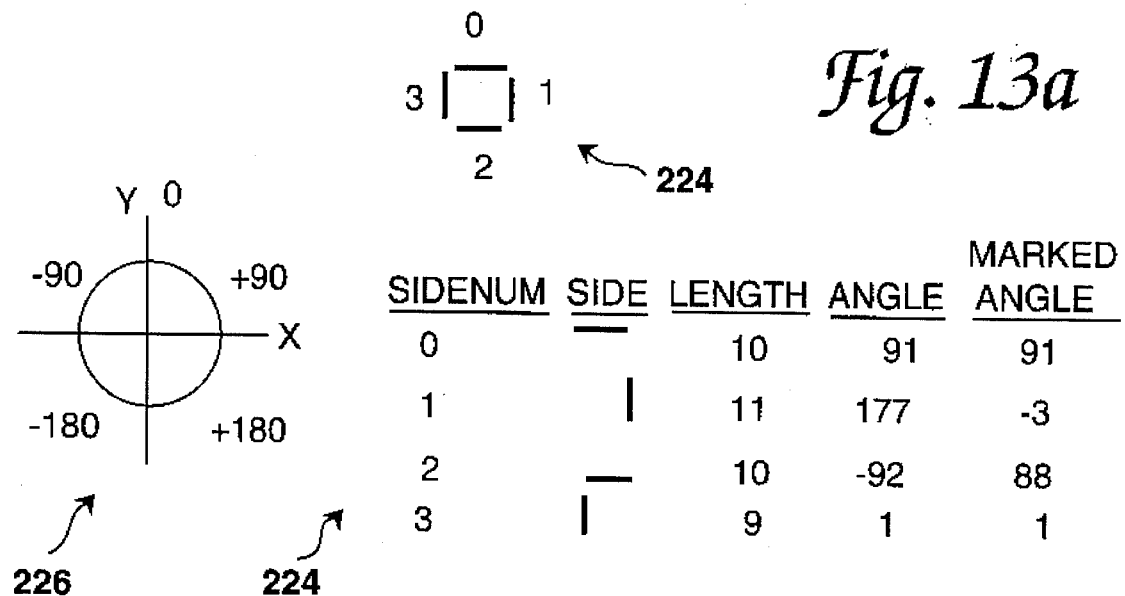
FIGS. 13A–13C help illustrate the "look at angles of sides" step of FIG. 12.
Figure 13B:
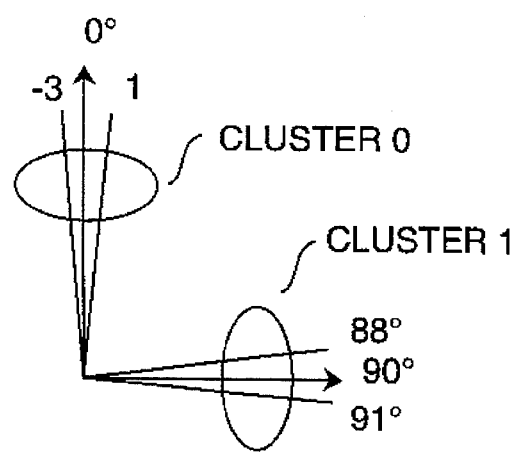
Figure 13C:
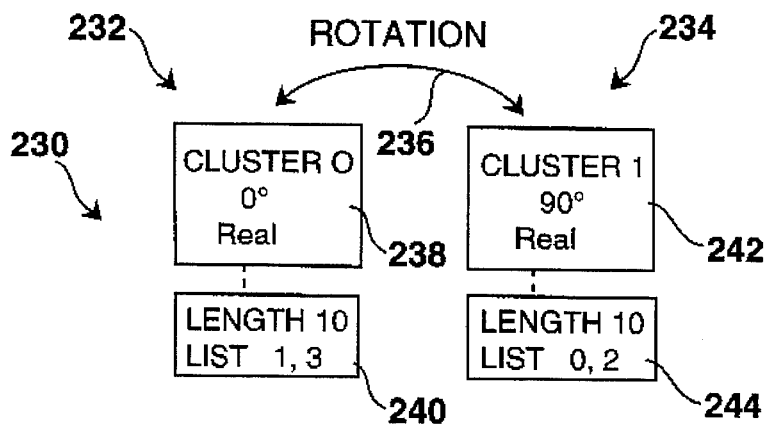

FIGS. 13A–13C illustrate the "cluster and process" step 216 of FIG. 12. In FIG. 13A, a Table 224 has columns SIDENUM, SIDE, LENGTH, ANGLE, and MAPPED ANGLE. The various angles are taken from the coordinate system shown at 226. In the coordinate system of 226, 0° is at the positive, vertical axis, 90° is at the positive, horizontal axis, ±180° are at the negative vertical axis, and –90° is at the negative, horizontal axis. For this example, assume that a square 228 is drawn with sides 0, 1, 2, and 3. Then, in Table 224, side number 0 would be the upper horizontal stroke, which may have a length 10, and an angle of 91°. Similarly, side number 1 would be the right-most vertical stroke having a length of, perhaps, 11 and an angle of 177°. Side number 2 would be the bottom horizontal stroke of length 10 and angle –92°, and side number 3 would be the left-most vertical stroke of length 9 and angle 1°.

As part of the clustering step, all of the angles of the sides are mapped to cluster around the 0° axis and the 90° axis. Side number 0 having an angle 91° is therefore mapped to an angle of 91° (i.e. the same angle). Side number 1 having an angle of 177° is mapped to an angle of –3° by reflecting it around the X axis. Side number 2 having an angle of –92° is mapped to 88°, again by reflecting it around the Y axis. Side number 3 having an angle of 1° is mapped to the same angle.

In FIG. 13B, the mapped angles of Table 224 are shown in graphical form. It can be seen in this figure that side numbers 1 and 3 cluster around the 0° axis, and sides 0 and 2 cluster around the 90° axis. Side numbers 1 and 3 form a first cluster 0, and side numbers 0 and 2 form a second cluster 1. Additional information concerning clustering techniques can be found in *Pattern Classification and Scene Analysis,* of Richard O. Duda & Peter E. Hart, John Wiley & Sons, 1973.

FIG. 13C illustrates a preferred data structure for the sides after the clustering step has been accomplished. The data structure is hierarchical first by angle and then by length. Relationships are also provided between the cluster data structures. For example, the data structure 230 includes a structure 232 for cluster 0, a data structure 234 for cluster 1, and a relationship 236 between the two data structures 232 and 234. The data structure 232 includes a head structure 238 including the cluster number, the cluster angle, and whether the cluster is "real" or "virtual." A real cluster is one formed from the sides of a group, while a virtual cluster is used for a purpose to be discussed subsequently. Data structure 232 also includes a tail structure 240 having a list of included sides, which in this case are sides 1 and 3. The tail structure 240 also lists the length as being 10. If there were other sides in cluster 0 having a substantially different length, such as a length of 15, another tail structure listing those side numbers would be provided for the head structure 238. Similarly, data structure 234 includes a head structure 242 and a tail structure 244. If there were other lengths of sides within cluster 1, additional tail structures would be provided for the head structure 242. The relationship 236 indicates that cluster 1 is a rotation of cluster 0, and vice versa. In the present embodiment, rotation always implies a 90° relationship between two clusters.

Figure 13D:
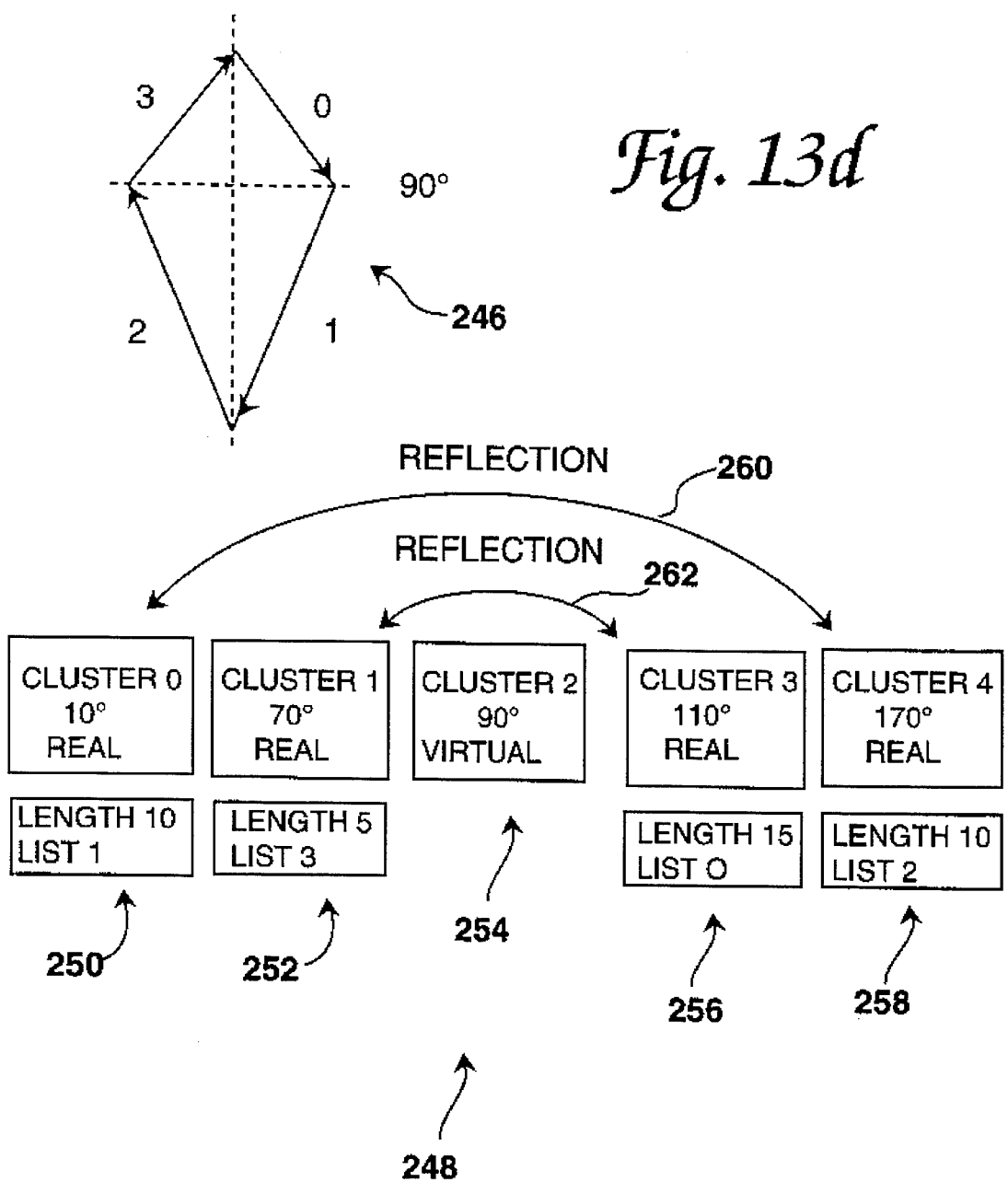
FIG. 13D illustrates the "generate equations" step of FIG. 12.

FIG. 13D will be used to help describe step 218 of FIG. 12. To aid in the discussion, a diamond shaped polygon comprising four strokes 0, 1, 2, and 3, will be used. The diamond shaped polygon 246 undergoes the clustering step 216 of FIG. 12 (as was explained with reference to FIGS. 13A–13C) and a data structure 248 is formed having five clusters numbered 0, 1, 2, 3, and 4. Clusters 0, 1, 3, and 4 are "real" clusters, while cluster 2 is a virtual cluster around the 90° axis. Data structures 250, 252, 254, 256, and 258 are created from the four sides of polygon 246 as indicated. It should be noted that while data structures 250, 252, 256, and 258 all include head structures and tail structures, the data structure 254 includes only a head structure because, as a virtual cluster, it does not include any of the sides of polygon 246.

It should also be noted that a couple of relationships 260 and 262 are provided between clusters of the data structure 248. More specifically, relationship 260 indicates there is a reflection between cluster 0 and cluster 4, and relationship 262 indicates there is a reflection between cluster 1 and cluster 3. In the present embodiment, a reflection is always at 0° or at 90°.

Figure 14:
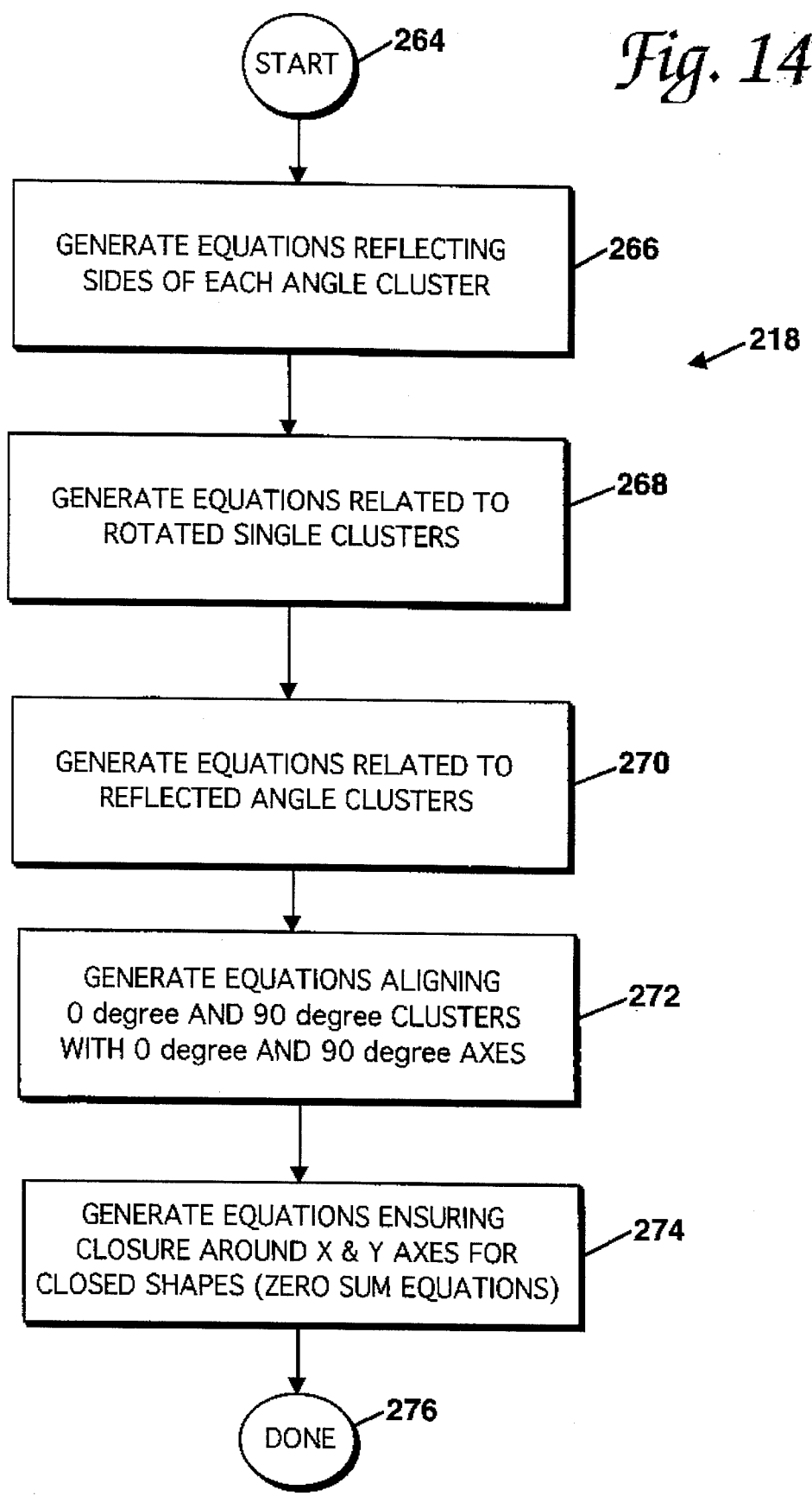
FIG. 14 is a flow diagram giving the process steps for "generate equations" step of FIG. 12.

FIG. 14 illustrates step 218 of FIG. 12 in greater detail. The process 218 begins at 264 and, in a step 266, equations are generated relating the sides of each angle cluster. Next, in a step 268, equations are generated relating rotated angle clusters. In a step 270, equations are generated relating to reflected angle clusters. Next, in a step 272, equations aligning 0° and 90° clusters with 0° and 90° axis, respectively. Finally, in a step 274, equations are generated ensuring closure around the X and Y axis for closed shapes, i.e. zero sum equations are generated. The process 218 is then completed as indicated at 276.

FIG. 15A illustrates, by example, step 266 of FIG. 14. In an Example 1, there are two parallel sides of the same length pointing in opposite directions. The equations generated then are $dx_1=-dx_2$ and $dy_1=dy_2$. In an example 2, the cluster includes two sides pointing in the same direction, but of unequal length. In this instance, the equations generated are $dx_1=kdx_2$ and $dy_1=kdy_2$, where k is equal to the quotient of the length of the first side to the length of the second side, i.e. k is less than 1.

FIG. 15B illustrates, by example, the step 270 of FIG. 14. In FIG. 15B, a first example includes two sides, pointing in different directions, which are reflected around the Y axis. In this instance, the equations generated are $dx_1=dx_2$ and $dy_1=-dy_2$. In example 2, the cluster again includes two sides, not pointing in the same direction. For this example 2, the equations generated are $dx_1=kdx_2$ and $dy_1=kdy_2$.

In FIG. 15C, the step 268 of FIG. 14 is illustrated by example. In FIG. 15C, an example 1 has two sides at substantially right angles to each other. In this case, the equations generated are $dx_1=dy_2$ and $dy_1=dx_2$. In an example 2, the two sides point to a common corner, and again are about at right angles to each other. The sides are of unequal length. In this instance, the equations generated are $dx_1=kdy_2$ and $dy_1=-kdx_2$. Again, k is equal to the ratio of the length of the shorter side to the longer side.

Figure 15D:
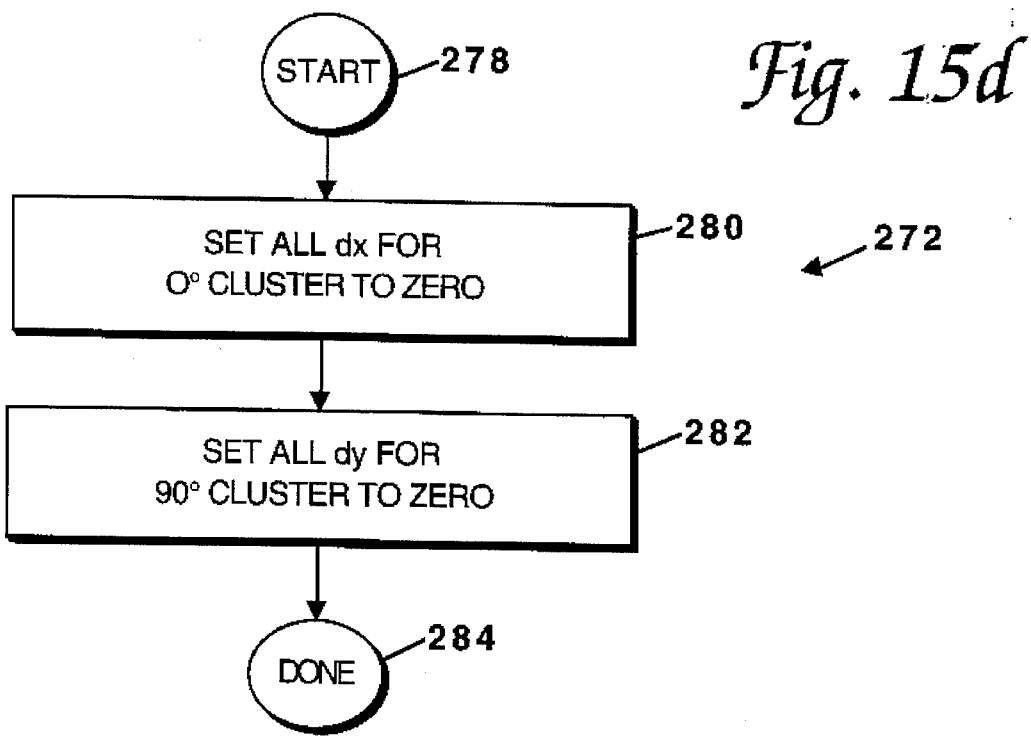
FIG. 15D is a flow diagram of the "generate equations aligning 0° and 90° clusters" step of FIG. 14.

FIG. 15D illustrates the step 272 of FIG. 14 in greater detail. The process 272 starts at 278, and all dx for the 0° cluster are set to zero in a step 280. Next, in a step 282, all the dy for the 90° clusters are set to zero. These two steps 280 and 282 effectively align the 0° and 90° clusters with the 0° and 90° axis, respectively. The process 282 is completed at step 284.

Figure 15E:
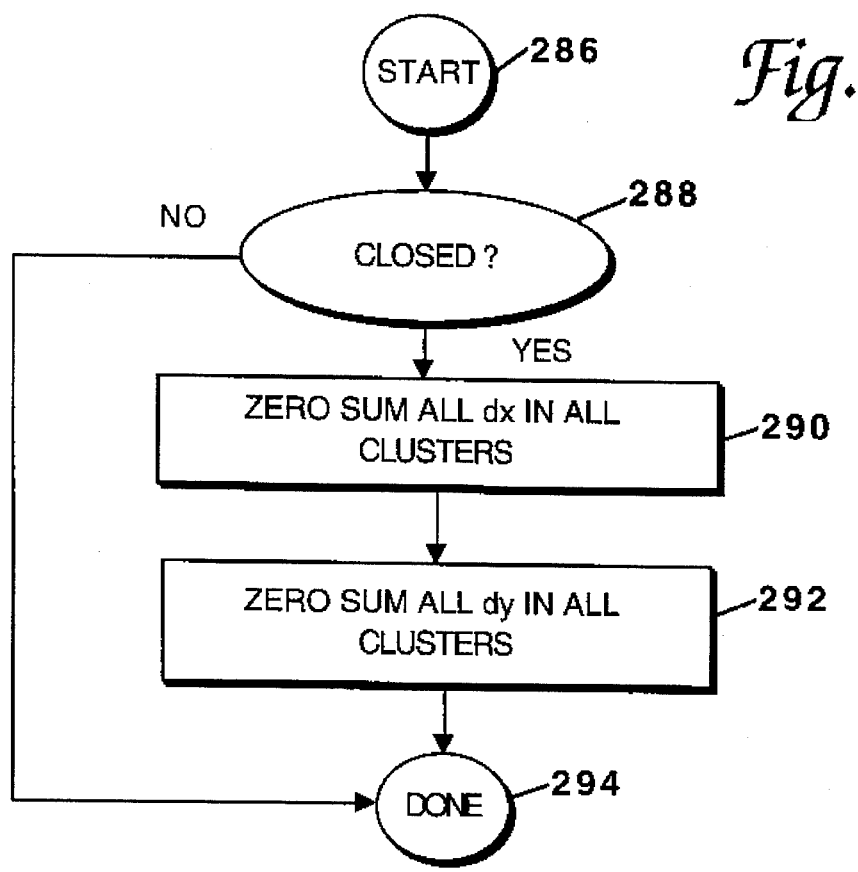
FIG. 15E is a flow diagram illustrating the "generate equations ensuring closure" step of FIG. 14.

FIG. 15E illustrates step 274 of FIG. 14. The process 274 begins at 286, and a decision step 288 determines whether the polygon is closed. This can be easily determined by finding the distance between the beginning point to the first stroke and the ending point of the last stroke and, if this distance is greater than a predetermined value, determining that the polygon is open. If it is determined that the polygon is closed, step 290 performs a zero sum of all dx in all clusters; i.e. $dx_0+dx_1+\ldots+dx_n=0$. Next, in a step 292, there is a zero sum of all dy in all clusters; i.e. an equation is generated where $dy_0+dy_1+\ldots+dy_n=0$. The process 274 is completed at 294.

Figure 16:
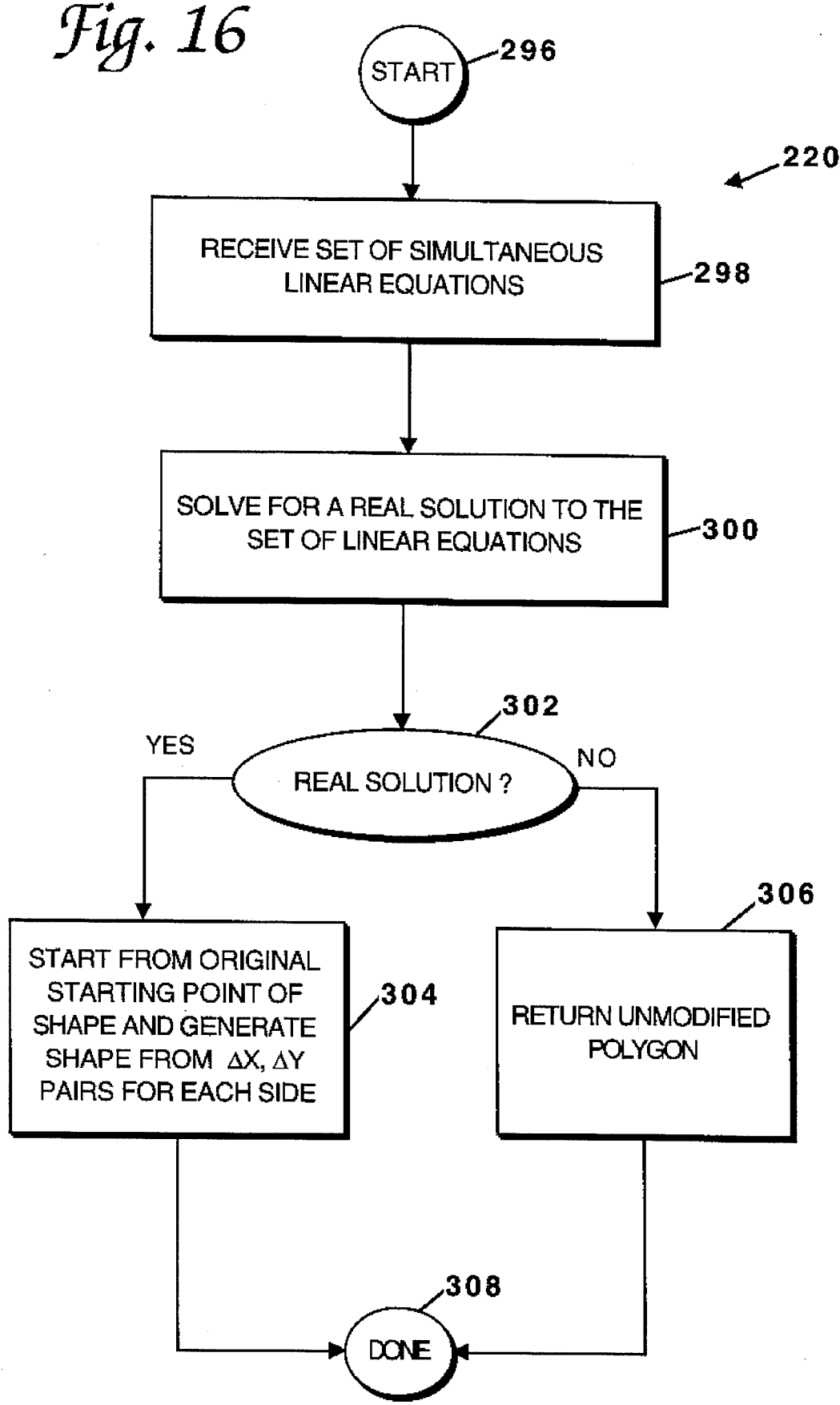
FIG. 16 is a flow diagram illustrating the "solve equations" step of FIG. 12.

FIG. 16 illustrates the "solve equations" step 220 of FIG. 12 in greater detail. The process 220 starts at 296, and a set of simultaneous linear equations (generated as described above) are received in a step 298. Step 300 attempts to find a real solution to the set of linear equations. There are, of course, many commercially available algorithms for solving simultaneous linear equations. It is then determined in a step 302 whether there is a real solution to the set of simultaneous linear equations. If there is a real solution, a polygon is formed starting from the original starting point of the shape and progressing from the $\Delta X$, $\Delta Y$ pairs for each progressive side. The process is then complete as indicated at 308. If step 302 determines that there is not a real solution to the set of simultaneous linear equations, the polygon is returned in an unmodified form in a step 306, and the process is again completed at 308.

Figure 17:
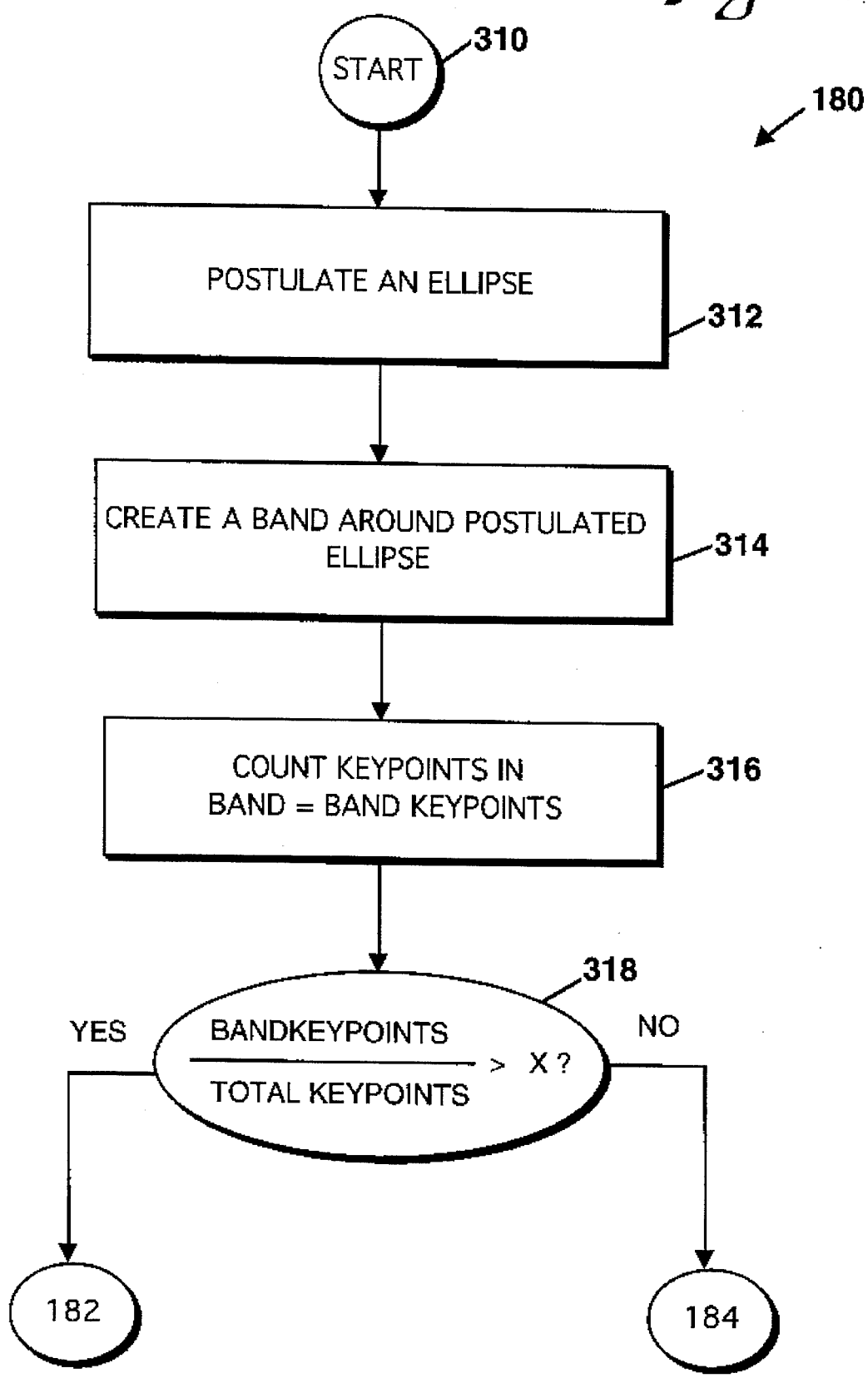
FIG. 17 is a flow diagram illustrating the. "circle or ellipse" step of FIG. 9.

FIG. 17 illustrates step 180 of FIG. 9 in greater detail. The process 180 begins at 310, and an ellipse is postulated in a step 312. Next, in a step 314, a band is created around the postulated ellipse and, in a step 316, the number of key points of the postulated ellipse that fall within the band are counted and stored within a variable BANDKEYPOINTS. Next, in a step 318, the quotient of BANDKEYPOINTS to the total number of key points is calculated and, if the quotient is greater than a predetermined value X, process control is returned to step 182 of FIG. 9. If the quotient is less than or equal to the value X, process control is returned to step 184 of FIG. 9.

Figure 18:
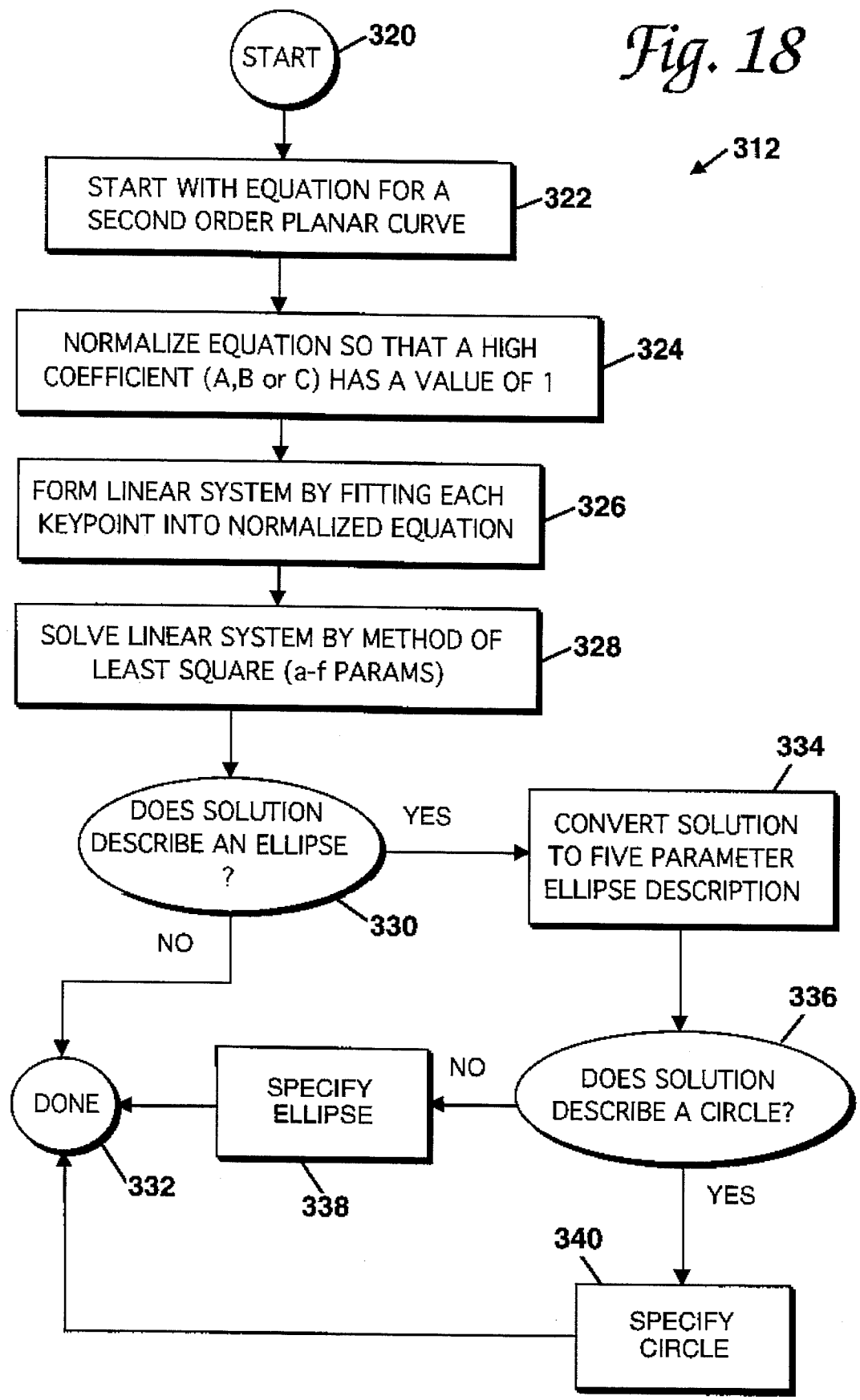
FIG. 18 is a flow diagram of the "postulate an ellipse" step of FIG. 17.

FIG. 18 illustrates step 312 of FIG. 17 in greater detail. Process 312 begins at 320, and in a step 322 the process starts with the equation for a general second order planar curve. As is well known to those skilled in the art, the equation of step 322 is of the form:

$$ax^2+bxy+cy^2+dx+ey+f=0$$

Next, in a step 324, the above equation is normalized so that one of the high-level coefficients (i.e. a, b, or c) has a value of 1. This avoids trivial solutions to the simultaneous equations to be solved subsequently. In step 326, a linear system is formed by inserting each key point (x,y) into the normalized equation. Step 328 then solves the linear system by the well-known least-squares method, i.e. the coefficients a - f are determined. Step 330 determines whether the coefficients describe an ellipse. Again, methodologies for determining whether a certain set of coefficients in a general second order planar curve form ellipses and other shapes are well known to those skilled in the art. If the coefficients do not describe an ellipse, the process 312 is completed at 332. If they do describe an ellipse, the a - f coefficients are converted to a more conventional five-parameter description of an ellipse. The five parameters are the (x,y) coordinates of the center of the ellipse, the small radius a, the large radius b, and the angle $\beta$ at which the ellipse is tilted relative to standard Cartesian coordinates. In step 336, it is determined whether the solution describes a circle, e.g. by examining the ratio of a/b. If the ratio a/b is sufficiently close to 1, the ellipse can be assumed to be a circle. If the solution does describe a circle, it is specified as a circle in step 340 and the process is complete at 332. If the solution does not describe a circle, an ellipse is specified in step 338 and the process is again complete at 332.

Figure 19:
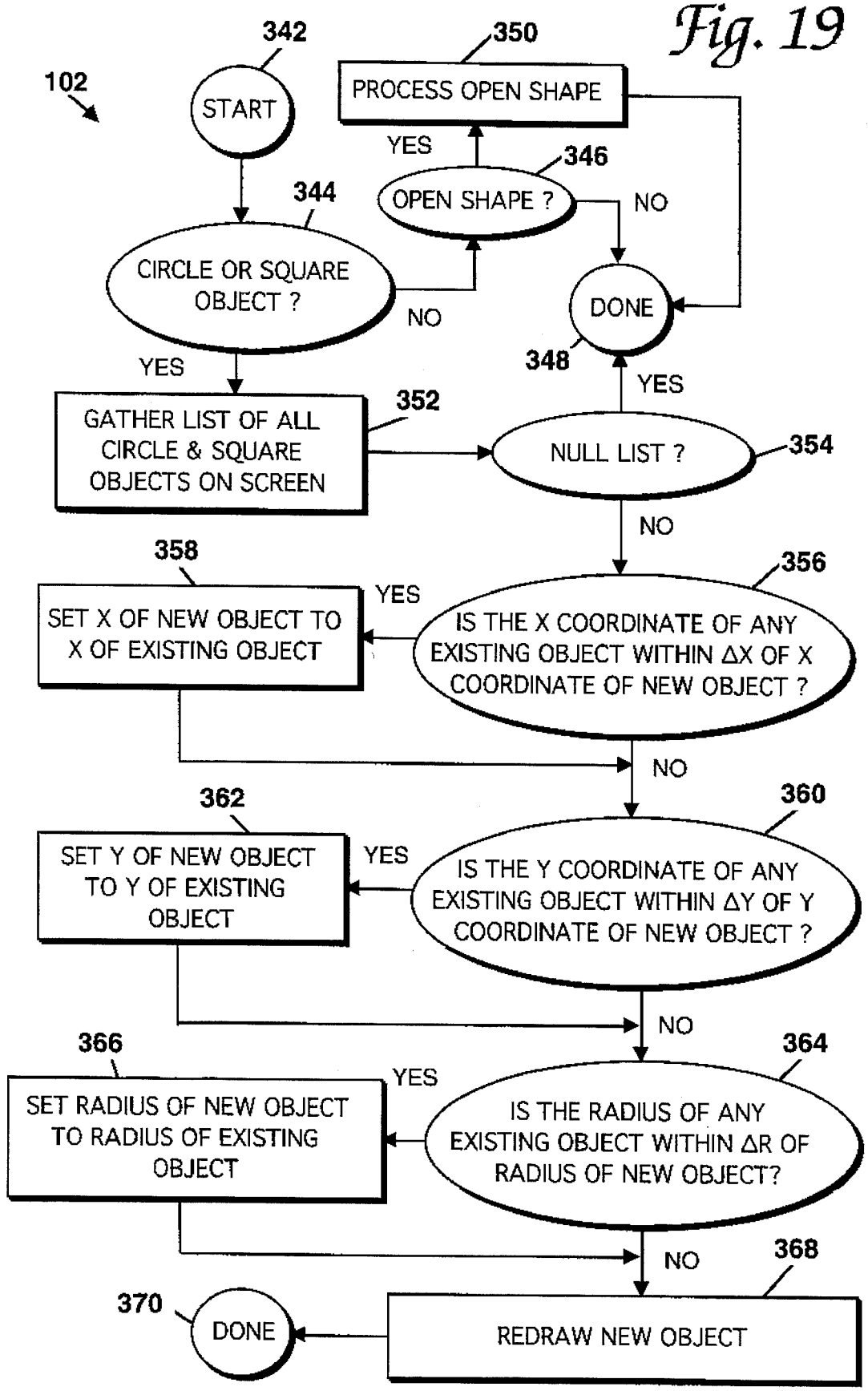
FIG. 19 is a flow diagram of the "look for related shapes" step of FIG. 4.

FIG. 19 illustrates step 102 of FIG. 4 in greater detail. The process 102 begins at 342 and, in a step 344, it is determined whether the recognized object is of a special limited class. In this case, the class comprises circles and squares. In other embodiments, this process can be generalized to other classes of objects. If the object is not a circle or a square, a step 346 determines whether it is an open shape. If it is, step 350 processes the open shape and the process is completed at 348. If it is not an open shape, the process is again complete at 348.

If the object is a circle or a square as determined by step 344, a step 352 gathers a list of all like objects on the screen. If step 354 determines that there aren't any like objects, the process is complete at 348. If there are like objects, a step 356 determines if the x coordinate of any existing like object is within a small amount $\Delta x$ of the x coordinate of the new object. If it is, a step 358 sets the x coordinate of the new object to the x coordinate of the existing object. In step 360 it is determined if the y coordinate of any existing like object is within a small amount $\Delta y$ of the y coordinate of the new object. If it is, a step 362 sets the y coordinate of the new object to the y coordinate of the existing object. In step 364 it is determined if the radius of any existing like object is within a small amount $\Delta r$ of the radius of the new object. If it is, a step 366 sets the radius of the new object to the radius of the existing object. The new object is then re-drawn in a step 368, and the process is complete at 370.

The effect of process 102 of FIG. 19 is to align and conform like objects on the screen of the computer. For example, if a first square is drawn, and then a second square is drawn to its right, the process 102 will attempt to align the squares along the same x axis and to make the sides (i.e. radius of the square) the same. If a circle is drawn, and a substantially larger circle is drawn around it, the circles will become concentric (but not of the same radius), because the process 102 will attempt to align the two circles around the same x and y axes. Since users often attempt to produce graphics in concentric or rectilinear fashions, the process 102 can be very useful.

Figure 20:
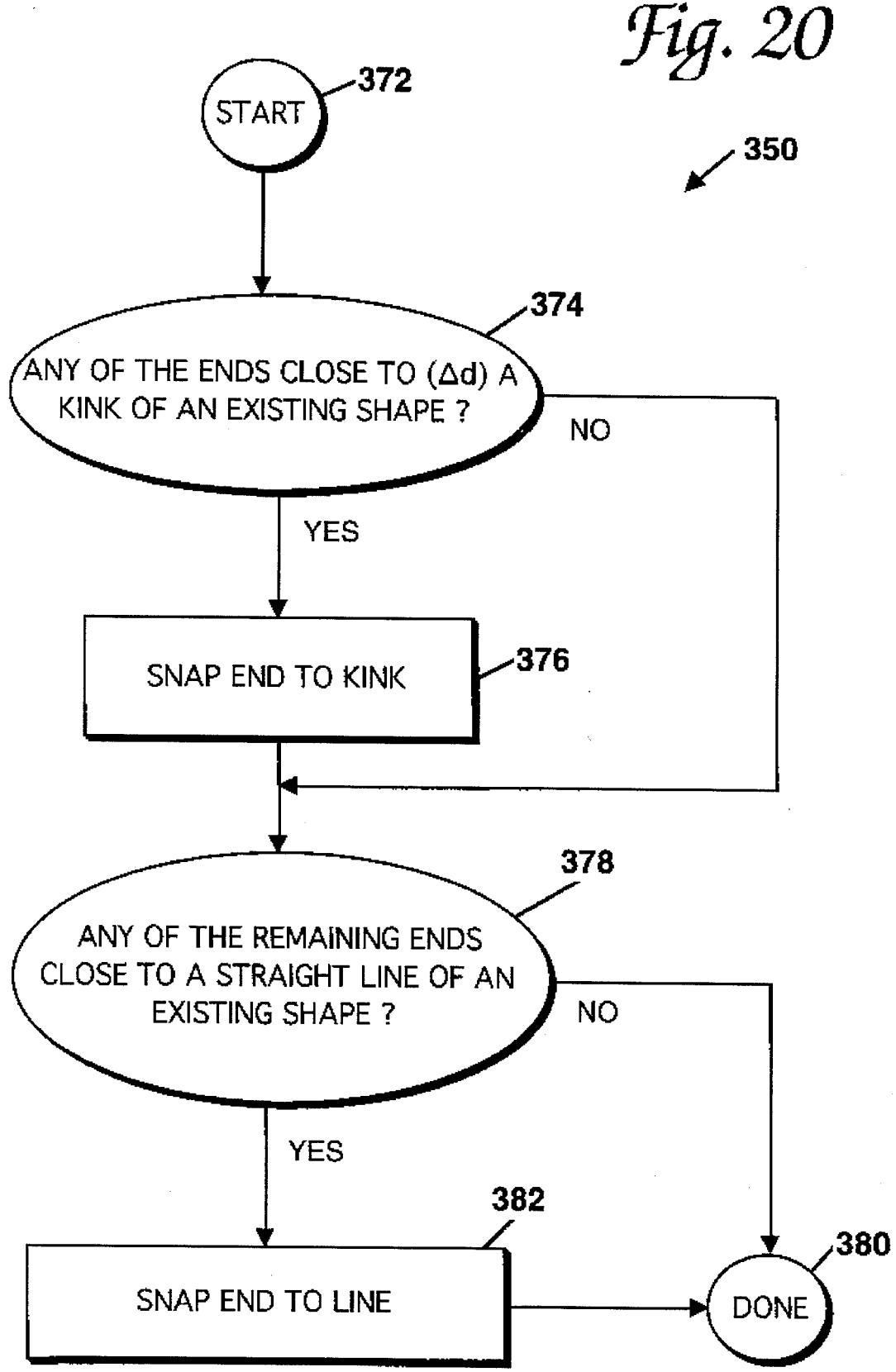
FIG. 20 is a flow diagram of the "process open shape" step of FIG. 19

FIG. 20 illustrates step 350 of FIG. 19 in greater detail. Process 350 begins at 372 and, in a step 374, determines whether any of the ends of the open shape are close (i.e. a small Δd from) a kink of an existing object. If it is, the open end or ends are "snapped" to the kinks of the existing object in a step 376, i.e. the open object is moved so that the open ends or end abut the kink or kinks of the existing object. Next, in a step 378, it is determined whether any of the remaining ends of the open shape are close to a straight line of an existing shape. If so, the end or ends are "snapped" to the end of the straight line(s) by translating the open shape to the line. The process is completed at 380.

While this invention has been described in terms of several preferred embodiments, there are alterations, permutations, and equivalents which fall within the scope of this invention. It is therefore intended that the following appended claims be interpreted as including all such alterations, permutations, and equivalents as fall within the true spirit and scope of the present invention.

What is claimed is:

1. A computer implemented method for recognizing and forming shapes presented on a display screen of a computer system, the method comprising the steps of:

receiving at least one incoming stroke drawn with a pointer on a display screeni creating a live group including the at least one incoming stroke;

characterizing shape sides from said live group, as one of the group consisting of straight shape sides and curved shape sides;

characterizing the live group as a polygon and generating a polygon from angles and vertex points between said sides if all of said shape sides are straight shape sides;

characterizing the live group as an ellipse and generating an ellipse by fitting the live group to a five parameter description of an ellipse if all of said shape sides are curved shape sides;

characterizing the live group as a composite curve from said shape sides if at least one of said shape sides is straight and at least one other of said shape sides is curved; and redrawing the live group on the display screen as a polygon, ellipse, or composite curve as generated or characterized in one of the three preceding steps.

2. A method for recognizing and forming shapes as recited in claim 1 wherein said step of characterizing shape sides comprises:

finding kinks in said live group;

defining shape sides as segments between said kinks; and determining whether said shape sides are one of the group consisting of straight shape sides and curved shape sides.

3. A method as recited in claim 1 wherein said step of creating a live group includes creating a group of at least two strokes related by at least one of the group consisting of time and space.

4. A method as recited in claim 1 further comprising a step of modifying at least one of location, size, and shape of a stroke group to conform the stroke group with other like objects displayed on said display screen.

5. A system for recognizing and redrawing shapes initially drawn by a user on a pointer-based computer, the system comprising:

a display screen sensitive to the position of a pointer on its surface;

means for defining strokes drawn on the display screen;

a stroke grouper which automatically groups strokes drawn on the display screen into stroke groups such that those strokes drawn proximate to one another in one of the group consisting of time and space are grouped in a stroke group;

means for defining sides of said stroke group;

means for determining whether each side of the stroke group is curved or straight;

means for automatically characterizing the stroke group as one of the group consisting of a polygon, an ellipse, and a composite curve such that when all sides of the stroke group are straight the stroke group is characterized as a polygon, when all sides of the stroke group are curved the stroke group is characterized as an ellipse, and when at least one side of the stroke group is curved and at least one other side of the stroke group is straight the stroke group is characterized as a composite curve;

means for generating a polygon from angles and vertex points between said sides if the stroke group is characterized as a polygon;

means for generating an ellipse by fitting the stroke group to a five parameter description of an ellipse if the stroke group is characterized as an ellipse; and means for displaying on said display screen a polygon, ellipse, or composite curve according to how the stroke group was characterized.

6. The system as recited in claim 5 further comprising means for closing open ends between the strokes in said stroke group.

7. A system as recited in claim 5 further comprising means for modifying at least one of location, size, and shape of said stroke group to conform the stroke group with other like objects displayed on said display screen.

8. The system as recited in claim 5 wherein said means for displaying displays curved sides according to a curve smoothing routine employing key points.

* * * * *